(12) United States Patent
Tolksdorf et al.

(10) Patent No.: US 10,497,003 B2
(45) Date of Patent: *Dec. 3, 2019

(54) SYSTEM AND METHOD FOR MANAGING CUSTOMER INTERACTIONS

(71) Applicant: GENESYS TELECOMMUNICATIONS LABORATORIES, INC., Daly City, CA (US)

(72) Inventors: Juergen Tolksdorf, Dortmund (DE); Christopher Connolly, New York, NY (US); Charlotte Toerck, Redwood City, CA (US); Merijn te Booij, Burlingame, CA (US); Herbert Willi Artur Ristock, Walnut Creek, CA (US); Robert Kassel, Somerville, MA (US); John Keyes, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,951

(22) Filed: Jun. 21, 2018

(65) Prior Publication Data

US 2018/0300732 A1    Oct. 18, 2018

Related U.S. Application Data

(63) Continuation of application No. 14/588,407, filed on Dec. 31, 2014, now Pat. No. 10,007,919.

(51) Int. Cl.
*G06Q 30/00* (2012.01)
(52) U.S. Cl.
CPC .................. *G06Q 30/016* (2013.01)
(58) Field of Classification Search
CPC .................................................. G06Q 30/016

(Continued)

(56) References Cited

U.S. PATENT DOCUMENTS 6,549,790 B1    4/2003    Rubbmark et al.
7,254,123 B2    8/2007    Jukarainen
(Continued)

FOREIGN PATENT DOCUMENTS

EP    1632884 A1    3/2006

OTHER PUBLICATIONS

Extended European Search Report for Application No. 15876126.2, dated Oct. 9, 2017, 9 pages.

(Continued)

*Primary Examiner* — Quynh H Nguyen

(57) ABSTRACT

A method for managing customer interactions includes: receiving first proximity information relating to a proximity between an electronic communication device carried by a customer and a first proximity device located in a first location of a physical establishment associated with a customer contact center; creating an interaction object including data corresponding to the first proximity information; receiving, by the processor, second proximity information relating to a proximity between the electronic communication device and a second proximity device located in a second location; modifying the interaction object to include data corresponding to the second proximity information; storing the interaction object in a first data storage device, wherein data of contact center interactions between the customer and resources of the customer contact center is also stored; and retrieving the stored data of the interaction object and the data of contact center interactions for generating an output based on the retrieved data.

20 Claims, 14 Drawing Sheets

(58) Field of Classification Search
USPC .......... 379/265.11, 265.01, 266.01, 309
See application file for complete search history.

(56) References Cited

U.S. PATENT DOCUMENTS

| | | | |
|---|---|---|---|
| 7,266,204 | B2 | 9/2007 | Watson et al. |
| 7,769,408 | B2 | 8/2010 | Hansson |
| 8,009,822 | B1 | 8/2011 | Boutcher et al. |
| 8,224,305 | B2 | 7/2012 | Gupta |
| 8,560,023 | B2 | 10/2013 | Luzzatto |
| 2002/0119800 | A1 | 8/2002 | Jaggers et al. |
| 2003/0198337 | A1 | 10/2003 | Lenard |
| 2005/0195960 | A1 | 9/2005 | Shaffer et al. |
| 2005/0239479 | A1 | 10/2005 | Bednasz |
| 2006/0047566 | A1 | 3/2006 | Fleming et al. |
| 2006/0208063 | A1 | 9/2006 | Patel et al. |
| 2007/0021148 | A1 | 1/2007 | Mahini |
| 2007/0025535 | A1 | 2/2007 | Bushey et al. |
| 2007/0117556 | A1 | 5/2007 | Rogalski |
| 2009/0081999 | A1 | 3/2009 | Khasawneh et al. |
| 2010/0169147 | A1 | 7/2010 | McCormack et al. |
| 2010/0198989 | A1 | 8/2010 | Jia et al. |
| 2010/0322407 | A1 | 12/2010 | Erhart et al. |
| 2012/0020473 | A1 | 1/2012 | Mart et al. |
| 2012/0314705 | A1 | 12/2012 | Howard |
| 2013/0059625 | A1 | 3/2013 | Clegg et al. |
| 2013/0095807 | A1 | 4/2013 | Bhaumik et al. |
| 2013/0226704 | A1 | 8/2013 | Fernandez |
| 2014/0164256 | A1 | 6/2014 | Booij et al. |
| 2014/0258062 | A1 | 9/2014 | Calman et al. |
| 2015/0025929 | A1 | 1/2015 | Abboud et al. |
| 2016/0189164 | A1 | 6/2016 | Tolksdorf et al. |
| 2016/0191712 | A1 | 6/2016 | Bouzid et al. |
| 2018/0249012 | A1 | 8/2018 | Bouzid et al. |

OTHER PUBLICATIONS

International Search Report and Written Opinion for Application No. PCT/2015/067739, dated Apr. 18, 2016, 13 pages.
International Search Report and Written Opinion for PCT/US2012/056324, dated Nov. 29, 2012, 6 pages.
Riberio, J, Google Glass Not to Allow Face Recognition for Now, Google said it first had to provide strong privacy protections, Networkworld, Jun. 3, 2013, 2 pages.

| | | Proficiency Level | | | | |
|---|---|---|---|---|---|---|
| | | Proximity of Agent Relative to Appropriate Electronic Communication Device 512a | Physical Location of Agent 512b | Data Communication Network Connection Quality 512c | Agent Ability to Access Customer Information 512d | Agent Ability to Engage in Interaction Using Appropriate Communication Channel 512e |
| Context | Purchase Product | Numerical Value | Numerical Value | Numerical Value | Numerical Value | Numerical Value |
| | Complaint | Numerical Value | Numerical Value | Numerical Value | Numerical Value | Numerical Value |
| | Technical Support | Numerical Value | Numerical Value | Numerical Value | Numerical Value | Numerical Value |
| | Follow-up to Previous Interaction | Numerical Value | Numerical Value | Numerical Value | Numerical Value | Numerical Value |
| | Communication Device | Numerical Value | Numerical Value | Numerical Value | Numerical Value | Numerical Value |
| | Communication Channel | Numerical Value | Numerical Value | Numerical Value | Numerical Value | Numerical Value |

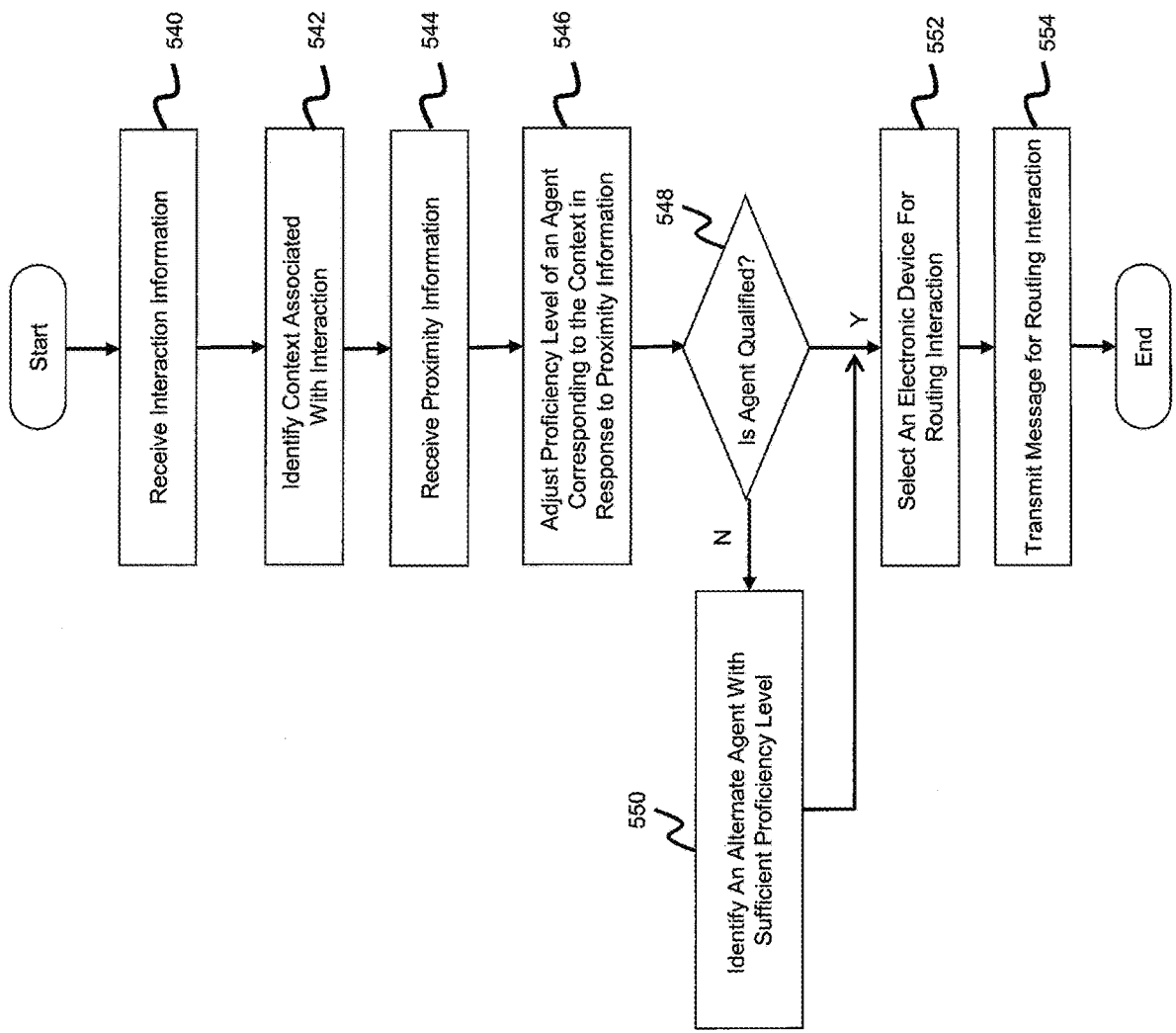

SYSTEM AND METHOD FOR MANAGING CUSTOMER INTERACTIONS

CROSS REFERENCE TO RELATED APPLICATION

This application is a continuation of U.S. patent application Ser. No. 14/588,407, filed on Dec. 31, 2014, now U.S. Pat. No. 10,007,919, which is related to U.S. application Ser. No. 14/588,403, filed on Dec. 31, 2014, now U.S. Pat. No. 9,992,341, the entire content of which are incorporated herein by reference.

FIELD

Aspects of embodiments of the present invention relate to systems and methods for managing customer interactions.

BACKGROUND

In order to remain competitive in the modern commerce system, many businesses remain constantly vigilant of evolving consumer demands, and strive to provide customers with the high quality products and services that they desire. To that end, many businesses employ contact centers that include automated systems and representatives of the business to process transactions and/or service the needs of their customers. Such contact centers may utilize a number of communication channels to engage customers, such as telephone, email, live web chat, and the like.

In order to facilitate providing high quality products and services to clients while remaining competitive and profitable, businesses may wish to collect information about customers' interactions with the business. For example, businesses may wish to monitor the quality of service provided by employees, whether customers' complaints are resolved, the type of interactions between employees and customers, customer profile information, customer demand for or satisfaction with certain products or services, and the like. In the context of a contact center, such information may be relatively easy to collect for subsequent analysis, because an interaction between a customer and the contact center can be recorded, and information about the interaction can be stored electronically. In the context of a brick-and-mortar business operation, however, such information may be difficult to track or record, which may reduce the effectiveness of service provided to customers visiting a business' physical branch locations.

Additionally, in the context of a contact center, the quality of service to a customer communicating with agents in the contact center may depend on many factors such as the agents' skill level, but also the agents' ability to access relevant information about the customer during a communication session, and agents' ability to quickly and efficiently engage in communications or interactions with customers. In certain circumstances, however, qualified agents may not be in close physical proximity to a work station or particular communication device, or agents may not have access to certain mediums or channels of communication, depending on their activities or physical location during the day. Such variability in agents' access to different communication mechanisms may complicate routing decisions and may reduce the quality of service perceived by customers.

The above information discussed in this Background section is only for enhancement of understanding of the background of the described technology and therefore it may contain information that does not constitute prior art that is already known to a person having ordinary skill in the art.

SUMMARY

Embodiments of the present invention are directed to systems and methods for monitoring customer interactions.

According to embodiments of the present invention, in a method for managing customer interactions, the method includes: receiving, by a processor, first proximity information relating to a proximity between an electronic communication device carried by a customer and a first proximity device located in a first location of a physical establishment associated with a customer contact center; in response to the receiving of the first proximity information, creating, by the processor, an interaction object including data corresponding to the first proximity information; receiving, by the processor, second proximity information relating to a proximity between the electronic communication device and a second proximity device located in a second location of the physical establishment; in response to the receiving of the second proximity information, modifying, by the processor, the interaction object to include data corresponding to the second proximity information; storing, by the processor, the interaction object in a first data storage device in association with a customer, wherein the first data storage device or a second data storage device further stores data of contact center interactions between the customer and resources of the customer contact center; and retrieving, by the processor, the stored data of the interaction object and the data of contact center interactions for generating an output based on the retrieved data.

The interaction object may include a user identification corresponding to the electronic device.

The interaction object may include first interaction time data corresponding to the first proximity information, and second interaction time data corresponding to the second proximity information.

The first interaction time data and the second interaction time data may be evaluated for determining satisfaction of an objective associated with the physical establishment.

The interaction object may include interaction activity data corresponding to the first proximity information.

The interaction object may include media type data corresponding to the first proximity information.

The interaction object may include a session identification corresponding to the first proximity information.

The method may further include: receiving, by the processor, context information associated with the interaction corresponding to the first proximity information; identifying, by the processor, an agent qualified to handle the interaction based on the context information associated with the interaction; and transmitting, by the processor, a message for routing the interaction to the agent.

The method may further include transmitting, by the processor, a notification corresponding to the interaction to an agent device associated with the agent.

The context information may include a topic of the interaction.

The context associated with the interaction may include a previous interaction related to the interaction.

The output may be display of the retrieved data on a display device of an agent of the customer contact center.

The method may further include: initiating, by the processor, a request for communication between a first resource at the physical establishment and a second resource associated with the customer contact center; forwarding, by the processor, the interaction object in association with the request; and establishing, by the processor, the communication between the first resource and the second resource.

According to embodiments of the present invention, a system for managing customer interactions includes: a processor; and a memory in communication with the processor, the memory storing instructions that, when executed by the processor, cause the processor to: receive first proximity information relating to a proximity between an electronic communication device carried by a customer and a first proximity device located in a first location of a physical establishment associated with a customer contact center; in response to the receipt of the first proximity information, create an interaction object including data corresponding to the first proximity information; receive second proximity information relating to a proximity between the electronic communication device and a second proximity device located in a second location of the physical establishment; in response to the receipt of the second proximity information, modify the interaction object to include data corresponding to the second proximity information; storing the interaction object in a first data storage device in association with a customer, wherein the first data storage device or a second data storage device further stores data of contact center interactions between the customer and resources of the customer contact center; and retrieving, by the processor, the stored data of the interaction object and the data of contact center interactions for generating an output based on the retrieved data.

The interaction object may include a user identification corresponding to the electronic device.

The interaction object may include first interaction time data corresponding to the first proximity information, and second interaction time data corresponding to the second proximity information.

The first interaction time data and the second interaction time data may be evaluated for determining satisfaction of an objective associated with the physical establishment.

The interaction object may include interaction activity data corresponding to the first proximity information.

The interaction object may include media type data corresponding to the first proximity information.

The interaction object may include a session identification corresponding to the first proximity information.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein:

FIG. 6B illustrate an example process of managing customer interactions in the context of a contact center as part of the customer interaction management system according to some embodiments of the present invention;

FIG. 7 is a flow diagram of a process executed by the customer interaction system in routing interactions according to agent proximity information according to embodiments of the present invention;

DETAILED DESCRIPTION

Figure 1:
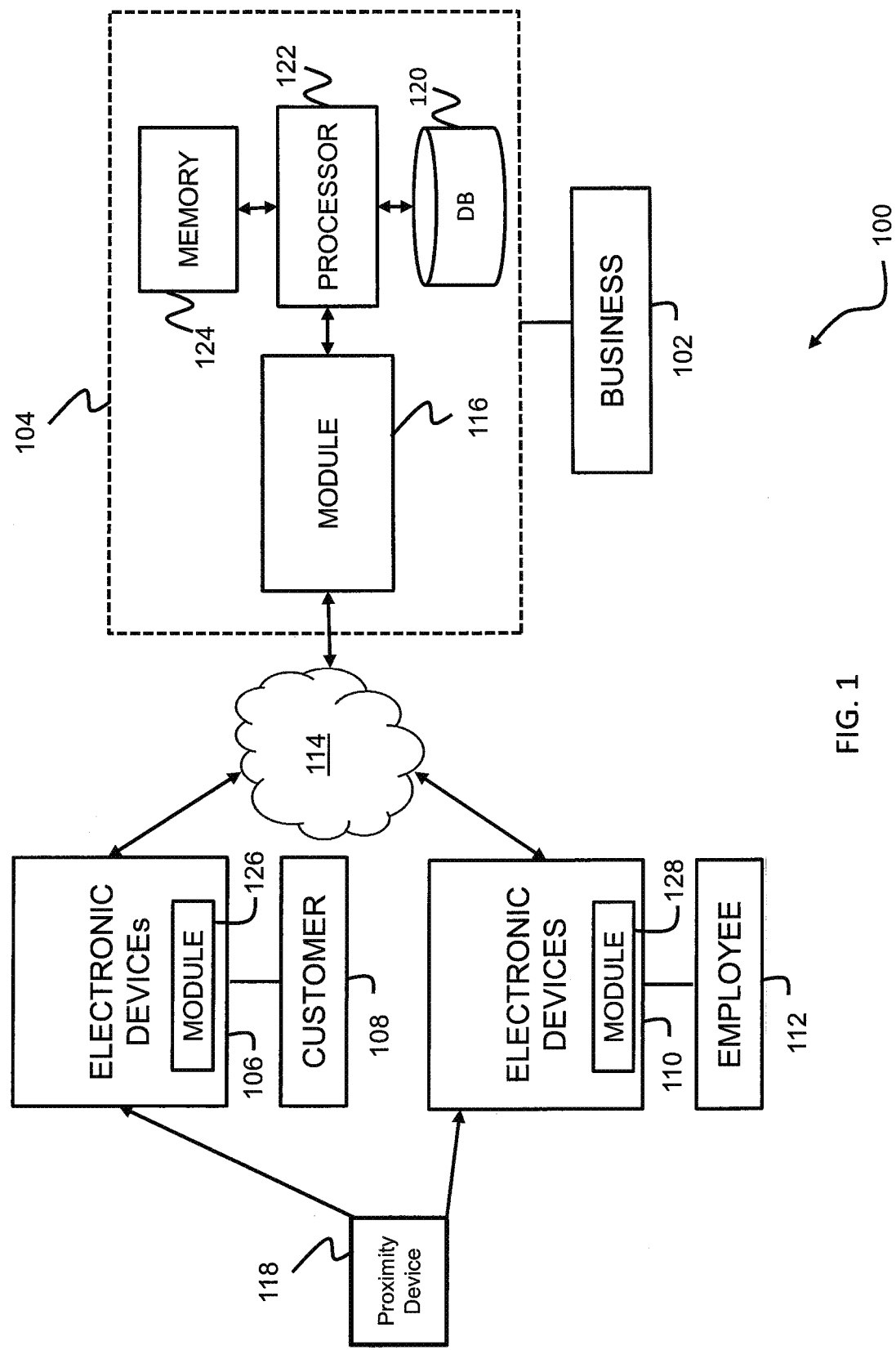
FIG. 1 is a block diagram of a plurality of electronic devices in electronic communication over a network as part of a customer interaction system according to some embodiments of the present invention.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

In general terms, embodiments of the present invention are directed to systems and methods for monitoring customer interactions.

Contact centers provide businesses with a valuable tool to manage interactions with customers. As part of the modern contact center environment, a large amount of information is collected for subsequent analysis and use by businesses operating the contact center. For example, an interaction between customers and agents of a contact center may be recorded along with information about the nature of the interaction, what was accomplished or discussed during the interaction, and the like. Contact centers may utilize such information for many different valuable purposes to support their business objectives. For example, information gathered during the course of an interaction may be utilized to train contact center agents to provide better customer support, make staffing decisions, adjust routing rules or protocols, initiate follow-up interactions with customers, learn information about consumer needs and desires, and the like.

At traditional brick-and-mortar business locations (e.g., physical establishments) such as branch locations of retail or service providers, such information is less convenient to collect. For example, it would not be uncommon for a customer to enter a retail location, spend several minutes browsing various products for sale, ask an employee questions about the products, complain about a previous transaction, purchase a product, and then leave the store without any actionable record of a majority of the activities engaged in by the customer. Such occurrences are often a lost opportunity to businesses, for example, to provide better customer support, learn about customer interests, resolve customer complaints, and the like. Embodiments of the present invention therefore, operate to provide a mechanism to collect information about interactions with customers at physical business locations in a way that mirrors the data collection capabilities of contact centers, by monitoring the physical proximity or location of customers during the interaction and recording interaction data.

Additionally, in the contact center environment, the physical location, environment, and activities of agents may influence their ability to effectively or efficiently engage in communications with customers. For example, agents who are working at an agent workstation may have full access to customer information stored in memory, including previous interaction history, previous purchase history, customer profile information, and the like. On the other hand, agents who are away from a work station may have reduced access to such customer information, which may result in reduced proficiency in handling interactions that require knowledge of customer information, but such agents may have a high level of technical knowledge or may be in close physical proximity to other highly-skilled agents and also have ongoing access to alternative communication channels such as mobile communication devices. Therefore, agents who are away from their workstation may remain well-suited to handle certain types of customer interactions depending on the nature of the customer interactions and the circumstances of the agents. Accordingly, embodiments of the present invention further operate to use proximity information of agents to adjust the proficiency level of agents in a contact center environment depending on the agents' circumstances (e.g., location/activities/environment), and their corresponding ability to engage in certain types of interactions, in order to inform routing decisions for customer interactions (e.g., whether to route to a different device or a different agent).

FIG. 1 is a block diagram of a plurality of electronic devices in electronic communication over a network as part of a customer interaction system 100, according to some embodiments of the present invention. The customer interaction system 100 includes a business 102 operating a proximity server 104, one or more electronic devices 106 operated by one or more users (e.g., customers) 108, and one or more electronic devices 110 operated by one or more users (e.g., employees or agents) 112. For convenience of description with respect to FIG. 1, the electronic devices 106 and 110 and the users 108 and 112 are referenced in the singular form, but the number of electronic devices 106 and 110 and users 108 and 112 may vary according to the design of the customer interaction system 100 and may include a plurality of electronic devices 106 and 110 and users 108 and 112.

The business 102 may be, for example, a retailer or service provider offering products and/or services to consumers as part of the commerce system. The user 108 may be a customer or consumer engaging in or attempting to engage in commercial transactions (e.g., by purchasing products and/or services) with the business 102 either at a physical commercial or retail (e.g., brick-and-mortar) location or physical establishment of the business 102, or electronically (e.g., by way of a contact center, online retail interface, virtual reality retail interface, etc.).

The user 112 may include, for example, an employee of the business 102 employed as an agent at a physical brick-and-mortar retail or service location. Alternatively, the user 112 may be, for example, a contact center agent or knowledge worker operating in a contact center environment.

The proximity server 104 is connected to (i.e., in electronic communication with) the plurality of electronic devices 106 and 110 over a data communications network 114 such as, for example, a local area network or a wide area network (e.g., a public Internet). The proximity server 104 includes one or more software modules (e.g., module 116, described in more detail below) for receiving and managing proximity data between the electronic devices 106 and 110 and one or more proximity devices 118. The proximity devices 118 may be any suitable proximity device capable of transmitting or emitting a wireless data signal for detecting or calculating proximity information of nearby electronic devices. For example, the proximity devices 118 may include one or more nodes of an indoor positioning system. For example, the proximity devices 118 may include any suitable electronic devices configured to act as electronic beacons, for example, using the iBeacon® data profile (or any other suitable electronic beacon protocol), to emit data signals for detection by other electronic devices for the purposes of detecting proximity or distance relative to the proximity devices.

According to some embodiments, the proximity devices 118 may emit a data packet or signal at regular or periodic intervals (e.g., ranging from every 20 milliseconds to 10 seconds, or any other suitable frequency according to the design of the customer interaction system 100). The data signal or packet may include, for example, a unique identifier value that is unique to each proximity device 118 for distinguishing between different proximity devices 118. The data signal or packet may also include a location identification value (e.g., representing the location of the proximity device 118), for example, major and minor numbers indicating groups of proximity devices 118 in a general area and the individual proximity device 118 within the corresponding group. The data signal or packet may additionally include distance calculating data for calculating a distance between electronic devices receiving the data signal or packet and the proximity device 118. For example, the distance calculating data may include transmission power data, which may include a predetermined value indicating the strength of the data signal or packet at a predetermined distance (e.g., 1 meter) from the proximity device 118 emitting the data signal or packet. Then, for example, based on the signal strength and the transmission power data, the distance or relative proximity between an electronic device receiving the data signal or packet and the proximity device 118 may be calculated according to any suitable method known to a person having ordinary skill in the art. According to some embodiments, the distance calculation may be performed by the electronic device receiving the data signal or packet from the proximity device 118 and then transmitted to the proximity server 104, for example, through the network 114, or by way of one or more of the proximity devices 118 connected to the proximity server 104 through the network 114.

The proximity server 104 is also connected to or includes a mass storage device or database 120 such as, for example, a disk drive, drive array, flash memory, magnetic tape, or other suitable mass storage device for storing information used by the proximity server 104. For example, the mass storage device 120 may store personal profile information about the users 108 and 112 operating the electronic devices 106 and 110, such as contact information, unique identification information, demographic information, previous interaction information, product or service transaction information, and other contextual information regarding the users 108 and 112 or the electronic devices 106 and 110 that may be relevant to facilitating transactions between the users 108 and 112 and the business 102.

The proximity server 104 further includes a processor or central processing unit (CPU) 122, which executes program instructions and interacts with other system components to perform various methods and operations according to embodiments of the present invention. Additionally, the CPU 122 may include (or be in electronic communication with), for example, a graphics processing unit (GPU) for processing signals and data to display images on a display.

The proximity server 104 further includes a memory 124, which operates as an addressable memory unit for storing software instructions to be executed by the CPU 122. The memory 124 is implemented using any suitable memory device, such as a random access memory (RAM), and may additionally operate as a computer-readable storage medium having non-transitory computer readable instructions stored therein that when executed by a processor cause the processor to receive proximity information over the data communications network 114 to facilitate, for example, routing an interaction to an appropriate agent.

According to one embodiment of the present invention, the electronic devices 106 and 110 may connect to the data communications network 114 using a telephone connection, satellite connection, cable connection, radio frequency communication, or any suitable wired or wireless data communication mechanism. To this end, the electronic devices 106 and 110 may take the form of, for example, a personal computer (PC), hand-held personal computer (HPC), personal digital assistant (PDA), tablet or touch screen computer system, telephone, cellular telephone, smartphone, wearable communication device (e.g., having an optical head-mounted display), speech-enabled or smart television or display system, or any other suitable electronic communication device.

The proximity device 118 may be an indoor position system capable of emitting or transmitting a signal to the electronic devices 106 and 110 to enable proximity information to be generated. For example, the proximity device 118 may use a low energy proximity sensing technology to transmit a data signal (e.g., a universally unique identifier) to the electronic devices 106 and 110. The electronic devices 106 and 110 may each include an application module 126 and 128, respectively, that is configured to calculate a distance or proximity between the corresponding electronic device and the proximity device 118 based on the data signal received from the proximity device 118. For example, the application modules 126 and 128 may operate as part of a system or software application running on the electronic devices 106 and 110. In some embodiments, the application modules 126 and 128 may be embedded or incorporated into a software application associated with the business 102, which allows the users 108 and 112 to facilitate commercial transactions with the business 102. For example, business 102 may be a retailer or service provider offering a software application for installation on customers' local systems offering a portal or interface for purchasing or browsing products or services offered by the business 102, maintaining personal profile information, and the like, and the module 126 may be incorporated into the software application. In another embodiment, the modules 126 and 128 may operate as standalone software applications running on the electronic devices 106 and 110 to receive data from the proximity device 118 for generation of proximity information. In another embodiment, the data signal received by the proximity device 118 may be transmitted by the operating system operating on the application modules 126 and 128 to the proximity server 104 without involvement of a separate application (e.g., the modules 126 and 128) running on the electronic device.

Figure 2:
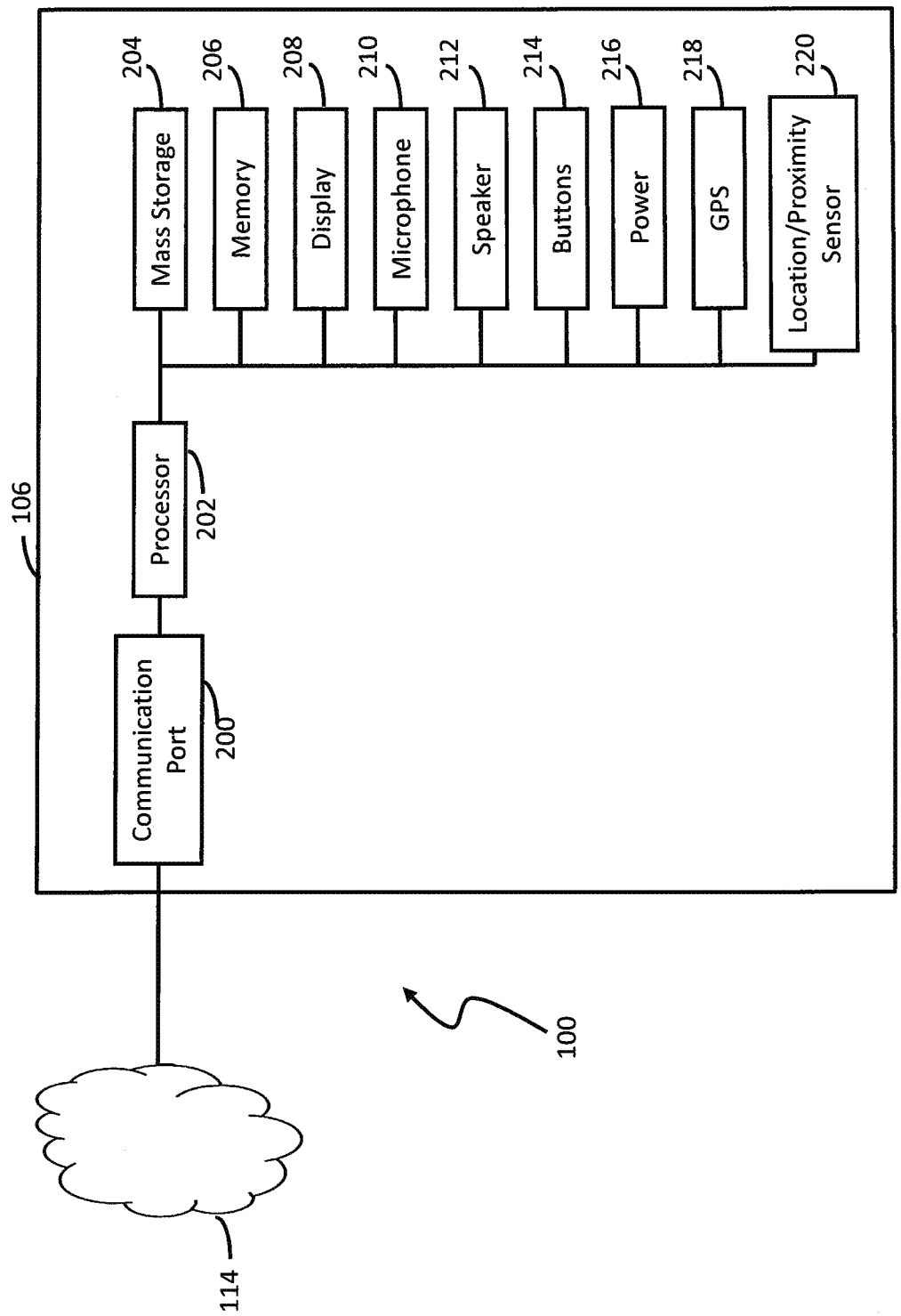
FIG. 2 is a more detailed block diagram of an electronic device operating as part of the customer interaction system of FIG. 1 according to embodiments of the present invention.

FIG. 2 is a more detailed block diagram of an example electronic device 106 operating as part of the customer interaction system 100, according to embodiments of the present invention. The electronic device 110 may have the same or similar components as the electronic device 106. The electronic device 106 includes a communication port 200, which is in electronic communication with the network 114 for sending and receiving data signals to other electronic devices 106 and the server 104. The communication port 200 represents one or more electronic communication data ports capable of sharing input and output data with external devices. Communication port 200 can be configured to receive data cables with a wired interface such as high-speed Ethernet, Universal Serial Bus (USB), High-Definition Multimedia Interface (HDMI), or other similar analog or digital data interface. Alternatively, communication port 200 may be configured to receive and transmit input and output (I/O) data wirelessly, for example, using available electromagnetic spectrum.

The communication port 200 is in electronic communication with a processor 202 of the electronic device 106 for processing data received by the communication port 200 and for transmitting data processed by the processor 202 to appropriate devices connected to the network 114.

The electronic device 106 further includes several other components that are controlled by the processor 202. For example, mass storage device or hard disk 204 is electrically connected to the processor 202 for storing data files on non-volatile memory for future access by the processor 202. The mass storage device 204 can be any suitable mass storage device such as a hard disk drive (HDD), flash memory, secure digital (SD) memory card, magnetic tape, compact disk, or digital video disk.

The electronic device 106 further includes electronic memory 206 for addressable memory or RAM data storage. Collectively, the processor 202, mass storage device 204, and electronic memory 206 may operate to facilitate commercial transactions in conjunction with the proximity server 104, such that the electronic memory 206 operates as a computer-readable storage medium having non-transitory computer readable instructions stored therein that when executed by the processor 202 cause the processor 202 to control managing customer interactions.

A display 208 is positioned externally on the electronic device 106 to facilitate user interaction with the electronic device 106. The display 208 may be a light-emitting diode (LED) display, liquid crystal display (LCD), organic LED display, or other suitable display capable of graphically displaying information and images to users. In one embodiment the display is a touch screen display capable of sensing touch input from users.

In one embodiment, the electronic device 106 further includes a microphone 210 and a speaker 212 for receipt and playback of audio signals. One or more buttons 214 (or other input devices such as, for example, keyboard, mouse, joystick, etc.) enable additional user interaction with the electronic device 106. The electronic device 106 further includes a power source 216, which may include a battery or may be configured to receive an alternating or direct current electrical power input for operation of the electronic device 106. The electronic device 106 may further include a global position system (GPS) sensor 218 for transmitting electronic signals to and receiving electronic signals from orbiting satellites to calculate the geographical location of the electronic device 106. The electronic device 106 may additionally include one or more location or proximity sensors or transceivers 220 configured to receive and transmit proximity data to other electronic devices (e.g., using a low energy proximity sensing protocol such as an iBeacon® profile data signal transmission, near field communication, Bluetooth®, low energy radio communication, or any other suitable wireless data communication protocol).

As will be discussed in more detail below, users may interact with the electronic device 106 to input information about an interaction or communication occurring between a retail or service provider and a consumer.

Embodiments of the present invention operate to facilitate the interactions between the user 108, the user 112, and the business 102 by enabling proximity information with respect to electronic devices and proximity devices to be collected, stored in memory, analyzed. Accordingly, the business 102 is enabled to provide more efficient or appropriate routing decisions for interactions between customers and agents or employees, and also to track in-person location and proximity information of customers and agents or employees to provide better or more effective customer service, as will be explained in more detail below.

Figure 3:
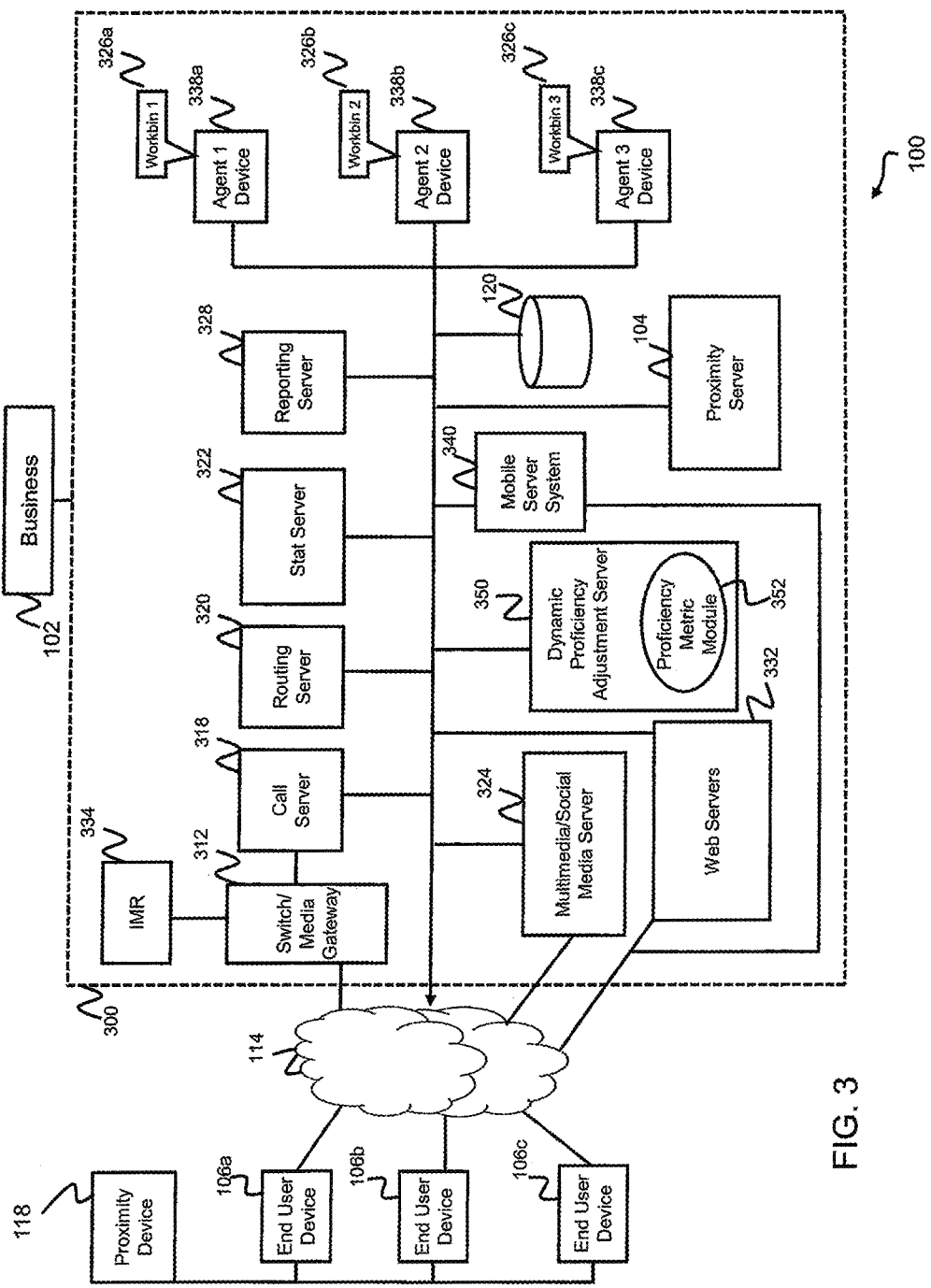
FIG. 3 is a more detailed block diagram of the customer interaction system of FIG. 1 according to some embodiments of the present invention.

FIG. 3 shows further detail of the customer interaction system 100 according to some embodiments of the present invention. In some embodiments, the business 102 may additionally support or include a contact center system 300 providing contact center services in furtherance of its business objectives. The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one example embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers, e.g., consumer 108) desiring to receive services from the contact center system 300 or the business 102 may initiate an inbound communication to the contact center system 300 via their end user devices 106a-106c (collectively referenced as electronic device 106). As discussed above, each of the electronic devices 106 may be any suitable communication device known in the art, such as, for example, a telephone, wireless phone, smart phone, personal computer, electronic tablet, wearable communication device (e.g., having an optical head-mounted display), and/or the like. Users operating the electronic devices 106 may initiate, manage, and respond to telephone calls, emails, chats, text messaging, web-browsing sessions, and other multi-media transactions.

Inbound and outbound communications from and to the electronic devices 106 may traverse the telephone, cellular, and/or data communication network 114 depending on the type of device that is being used. For example, the communications network 114 may include a private or public switched telephone network (PSTN), local area network (LAN), private wide area network (WAN), and/or public wide area network such as, for example, the Internet. The communications network 114 may also include a wireless carrier network including a code division multiple access (CDMA) network, global system for mobile communications (GSM) network, and/or any 3G or 4G network conventional in the art.

According to one example embodiment, the contact center system 300 includes a switch/media gateway 312 coupled to the communications network 114 for receiving and transmitting communications between end users and the contact center system 300. The switch/media gateway 312 may include a telephony switch or communication switch configured to function as a central switch for agent level routing within the center. In this regard, the switch 312 may include an automatic call distributor, a private branch exchange (PBX), an IP-based software switch, and/or any other switch configured to receive Internet-sourced calls and/or telephone network-sourced calls. According to one example embodiment of the invention, the switch is coupled to a communication server 318 which may, for example, serve as an adapter or interface between the switch and the remainder of the routing, monitoring, and other communication-handling components of the contact center.

The contact center may also include a multimedia/social media server for engaging in media interactions other than voice interactions with the end user devices 106 and/or web servers 332. The media interactions may be related, for example, to email, vmail (voice mail through email), chat, video, text-messaging, web, social media, co-browsing, and the like. The web servers 332 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one example embodiment of the invention, the switch 312 is coupled to an interactive media response (IMR) server 334, which may also be referred to as a self-help system, virtual assistant, or the like. The IMR server 334 may be similar to an interactive voice response (IVR) server, except that the IMR server 334 is not restricted to voice, but may cover a variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 334, customers may complete service without needing to speak with an agent. The IMR server 334 may also ask an open ended question such as, for example, "How can I help you?" and the customer may speak or otherwise enter a reason for contacting the contact center. The customer's response may then be used by the routing server 320 to route the call or communication to an appropriate contact center system 300 resource.

According to some embodiments of the present invention, the IMR server 334 may also receive proximity information, for example, from an electronic device 106 or 110 or from a proximity device 118. In response to the customer interaction system 100 (e.g., the IMR server 334) detecting that a user 108 is located in a certain area, the IMR server 334 may initiate or facilitate communications with the electronic device 106 operated by the user 108 and provide access to information about such communications to the customer interaction system 100 as a whole. For example, the user 108 may enter a retail location (or physical establishment) and the IMR server 334 may receive proximity information indicating that the electronic device 106 operated by the user 108 is close to a proximity device 118 located at or near the entrance of the retail location. Accordingly, the IMR server 334 may transmit a communication to the electronic device 106 asking the user 108 to provide information (e.g., via a graphical user interface displayed by the module 126, via a web-based interface displayed on a web browser operating on the electronic device 106, via SMS text messaging, etc.) regarding the purpose or context of the visit to the retail location. The IMR server 334 may additionally transmit a message to the electronic device 106 instructing the user 108 to proceed to a waiting area, and advising the user 108 of estimated wait times. Additionally, if the user 108 initiates communication with the IMR server 334 while the user 108 is in proximity to a proximity device 118, for example, by initiating a voice or text-based communication with an agent, the IMR server 334 may provide information about such communications to subsequent agents helping the user 108 in person.

If the communication is to be routed to an agent, the communication may be forwarded to the communication server 318 which interacts with a routing server 320 for finding an appropriate agent for processing the communication. The communication server 318 may be configured to process PSTN calls, VoIP calls, and the like, or other text or non-audio based communications (e.g., chat sessions). For example, the communication server 318 may include a session initiation protocol (SIP) server for processing SIP calls. According to some example embodiments, the communication server 318 may, for example, extract data about the customer interaction such as the customer's telephone number, often known as the automatic number identification (ANI) number, or the customer's internet protocol (IP) address, or email address.

In some embodiments, the routing server 320 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 120. The routing server 320 may query the customer information from the customer database via an ANI or any other information collected by the IMR 334 and forwarded to the routing server by the communication server 318.

Once an appropriate agent is available to handle a communication, a connection is made between the customer and the agent device 338a-338c (collectively referenced as 338) of the identified agent. Collected information about the customer and/or the customer's historical information may also be provided to the agent device for aiding the agent in better servicing the communication. In this regard, each agent device 338 may include a telephone adapted for regular telephone calls, VoIP calls, and the like. The agent device 338 may also include a computer for communicating with one or more servers of the contact center and performing data processing associated with contact center operations, and for interfacing with customers via voice and other multimedia communication mechanisms.

The selection of an appropriate agent for routing an inbound communication may be based, for example, on a routing strategy employed by the routing server 320, and further based on information about agent availability, skills, and other routing parameters provided, for example, by a statistics server 322.

The contact center system 300 may also include a reporting server 328 configured to generate reports from data aggregated by the statistics server 322. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 320 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 326a-326c (collectively referenced as 326) as a task to be completed by the agent. The agent's workbin may be implemented via any data structure conventional in the art, such as, for example, a linked list, array, and/or the like. The workbin may be maintained, for example, in buffer memory of each agent device 338.

According to one exemplary embodiment of the invention, the mass storage device(s) 120 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

According to one example embodiment, the contact center system further includes a mobile server system 340 for interacting with modules 126 and 128 installed in the electronic devices 106 and 110. The mobile server system 340 may also be configured to process interactions from a web browser invoked by a users' device. According to one embodiment, the mobile server system 340 is configured to interact with the modules 126 and 128 and contact center resources via the REST (representational state transfer) protocol as is conventional in the art.

According to one embodiment, the customer interaction system 100 also includes a proximity server system 104. The proximity server system 104 may operate to receive information from the electronic devices 106 (or the electronic devices 110 in FIG. 1) relating to the proximity of the electronic devices with respect to the proximity device 118. For example, as discussed above, the electronic devices 106 may receive a data signal (e.g., a universally unique identifier signal) from the proximity device 118, and in turn the module 126 operating on the electronic device 106 may calculate a distance between the electronic device 106 and the proximity device 118 based on the received signal from the proximity device 118. In another embodiment, the proximity device 118 may calculate the distance between the electronic device and the proximity device 118 and transmit the calculated distance to the proximity server 104. In still another embodiment, the calculation of the distance may be performed by an electronic device other than the electronic device operated by the user and the proximity device 118. For example, another electronic device such as the proximity server 104 may receive information about the signal transmitted between the proximity device 118 and the electronic device operated by the user and proceed with calculating the proximity or distance information.

As will be discussed in more detail below, in response to the electronic device 106 being within a close proximity to one or more proximity devices 118, the proximity server 104 may operate in conjunction with the routing server 320 to route an interaction to an agent depending on routing rules. Additionally, the proximity server 104 may operate to facilitate tracking the movement and interactions between customers and agents employees of the business 102 based on the proximity information received from electronic devices 106 (or the electronic devices 110).

According to one embodiment, the customer interaction system 100 also includes an analytics server or dynamic proficiency adjustment server 350, which in turn includes a proficiency metric module 352. The proficiency metric module 352 may be implemented via computer instructions that are stored in memory and executed by a processor for providing particular functionality. For example, the dynamic proficiency adjustment server 350 may contain instructions for computing, for each of various agents, one or more proficiency metrics associated with one or more different interaction topics and agent status. Each calculated proficiency metric may be stored in the mass storage device 120 in association with, for example, the particular agent. The stored proficiency metrics may be used by the routing server 320 to select an appropriate agent to handle an interaction for which an interaction reason may be deduced. In this regard, instead of relying on general skill parameters that may be hard-coded into a routing strategy, more specific agent proficiency metrics that are not part of the hard-coded routing strategy may be considered along with the agent's track history in regards to such agent proficiency, in estimating the agent's performance to handle an interaction with a specific interaction context (e.g., the reason for the interaction, the topic of the interaction, the customer profile, etc.), and routing the call or interaction to the agent with a suitable (e.g., threshold level or highest level among available agents) proficiency to handle the interaction.

For example, as will be discussed in more detail below, different calls or interactions may relate to different topics such as customers wishing to purchase products, lodge a complaint about a product or service, receive technical support, follow-up to previous interactions, or the like. Different agents or employees may possess different levels of skill or training for handling such interactions depending on the topic. For example, some agents or employees may have specialized technical skills generally suited to providing technical support to customers, while other agents or employees may be more or less knowledgeable about the characteristics of specific products or services a consumer wishes to purchase or complain about. Additionally, certain agents or employees may have interacted with a specific customer before, and may therefore be generally suited to engage in follow-up interactions with the specific customer.

Additionally, agent availability to have interactions routed to them may vary based on whether the agent is occupied with other interactions, as well as work flow assignments. For example, certain agents might have the full set of required skills for all defined service types. However, at a particular point in time, each agent may be assigned only to a particular subset of activities defined in an agent's schedule.

Additionally, in the context of a contact center, agents' proficiency for handling a particular interaction may vary depending on the agents' circumstances throughout the day, where proficiency is defined as an agent's ability to engage in a particular interaction based on their location, access to information and tools, and their physical environment or circumstances. An agent's proficiency level may vary throughout the day based on their changing circumstances, whereas their skill level may not change. For example, when an agent is seated at a desktop workstation, the agent may have access to all of the information that has been previously collected about a customer such as contact information, purchase history, demographic information, personality information, and the like. However, at certain times throughout the day, an agent may leave or check out of their work station in order to take a break, participate in a meeting, or assist in a project offsite. When an agent is not at his or her workstation, the agent may be able to receive communications on a mobile device or wearable communication device (e.g., having an optical head-mounted display), but may not have the same level of access to information about customers or products. Further, depending on an agent's location or environment, it may not be appropriate or possible for an agent to engage in an interaction with a customer, for example, if the agent is in a public area and the interaction may involve discussing private customer information, or if the agent is in an environment that has poor data communication network connectivity or significant environmental noise that would make communicating with a customer by voice difficult.

According to some embodiments of the present invention, therefore, the dynamic proficiency adjustment server 350 operates to facilitate routing of interactions between customers and agents or employees depending on the context of the interaction, the skill level of the agents or employees, and the dynamic proficiency of agents or employees based on their circumstances.

The various servers of FIG. 3 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 4A:
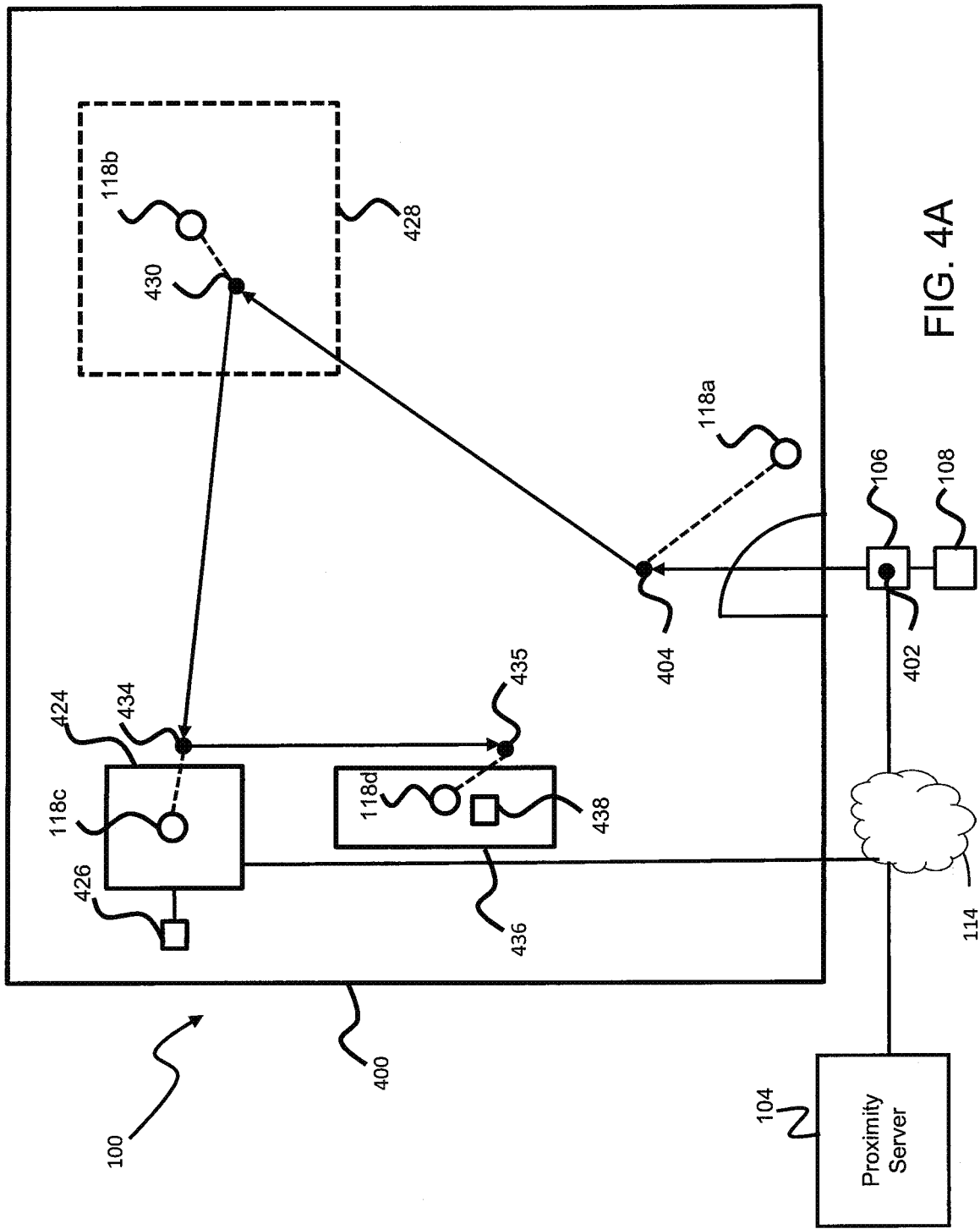
FIG. 4A is a floor map of a physical retail or branch location depicting an example path of a customer navigating the location according to some embodiments of the present invention.
Figure 4B:
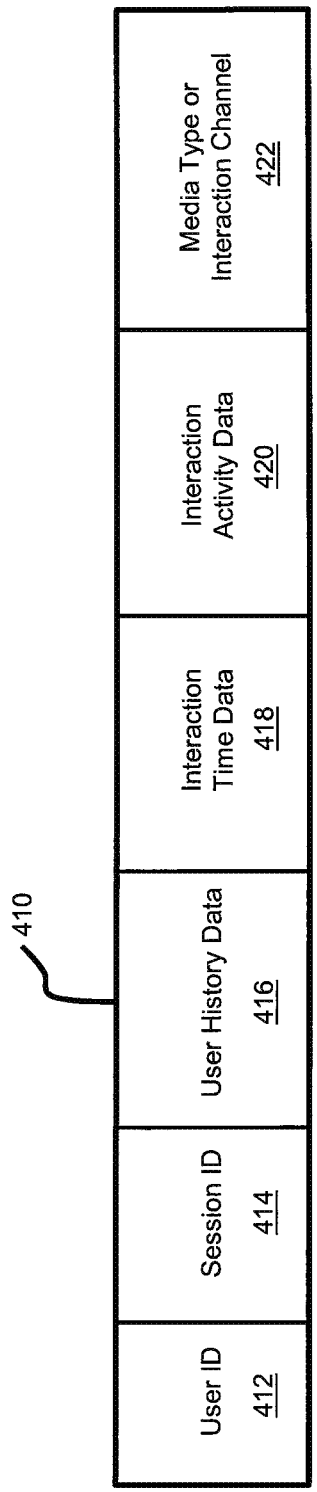
FIG. 4B is a conceptual layout diagram of an interaction object according to some embodiments of the present invention.

FIGS. 4A and 4B illustrate an example process of managing customer interactions at a physical retail or branch location (e.g., a physical establishment) 400 of the business 102 according to some embodiments of the present invention. As shown in FIG. 4A, a customer 108 may operate an electronic device 106 as part of the customer interaction system 100. Starting at location 402, the electronic device 106 may be outside of the proximity of a proximity device, because, for example, the customer 108 has not yet entered the branch location 400.

Upon the customer 108 entering the branch location 400, however, at location 404, the electronic device 106 may be within a close enough proximity to receive a signal from a first proximity device 118a as discussed above. That is, the proximity device 118a may be positioned, for example, at or near the entrance of the branch location 400. The location or coordinates of the proximity device 118 may be stored in memory, for example, in the memory 206 of the electronic device 106 or the memory 120 of the proximity server 104. The proximity device 118a may send a data signal (e.g., including a unique identifier signal) to the electronic device 106 and the module 126 of the electronic device 106 may then calculate a distance or relative proximity to the proximity device 118a according to a suitable distance calculating method known in the art, for example, based on the strength of the signal compared to a predetermined signal strength at a predetermined distance. In another embodiment, information about the data signal (including the data signal itself as well as signal strength) may be passed by the electronic device 106 to the proximity server 104, which calculates the distance or relative proximity between the electronic device 106 and the proximity device 118a. In still another embodiment, the distance may be calculated by the proximity device 118, or the calculated distance may be transmitted to the proximity server 104 by way of the proximity device connected to the proximity server 104 via the network 114.

In some embodiments, the location of the proximity device is known or predetermined (e.g., based on a mapping of the device's unique identification data to a predetermined physical location), the location of the electronic device 106 may be assumed to be the location of the proximity device 118 from which a signal is received. In some embodiments, the distance from the electronic device 106 to the proximity device 118 may be calculated based on the data signal received from the proximity device 118 and/or the strength of the data signal.

Additionally, upon detection of the proximity device 118a being in close proximity to the electronic device 106 (e.g., by receipt of the data signal by the electronic device 106), the proximity server 104 may generate an interaction object data 410, as shown in FIG. 4B. The interaction object data 410 may include user identification data 412 associated with or identifying the user 108. The user identification data 412 may be retrieved, for example, from the memory 120 in FIG. 1 or the memory 206 of the electronic device 106. The interaction object data 410 may further include a session identification data 414, unique to the present interaction session of the user 108 entering the branch location 400. The interaction object data 410 may additionally include user history data 416, which may be retrieved from the memory 120 or the memory 206 of the electronic device 106 and may include any relevant information relating to previous interactions or transactions between the user 108 and the business 102. For example, the user history data 416 may include information relating to previous communications with contact center agents or employees at the branch location 400, previous purchases, previous technical support issues, and the like.

The interaction object data 410 may further include one or more entries of interaction time data 418 corresponding to the present interaction of the user 108 entering the branch location 400. In addition, the interaction object data 410 may include interaction activity information or data 420 regarding (e.g., corresponding to) each of the entries of the interaction time data 418, for example, what activities were performed at each time entry, agents or employees interacting with the user 108, topics discussed, information corresponding to new or unfinished interactions, and the like. Additionally, for each entry in the interaction time data 418 and interaction activity data 420, the interaction object data 410 may further include media type or interaction channel 422, indicating the type of interaction media or communication channel (e.g., via voice, email, chat, video, SMS text messaging, store/in-person, etc.)

Returning to FIG. 4A, at point 404, the customer interaction system 100 may transmit (e.g., via the mobile server system 340) a message to the electronic device 106 (e.g., by way of the proximity server 104) to confirm that the customer interaction system 100 has recognized the arrival of the user 108 at the branch location 400. For example, according to some embodiments, prior to entering the branch location 400, the user 108 may prearrange an appointment with a particular agent or employee, or regarding a particular topic, at the branch location 400. According to some embodiments, the customer interaction system 100 may transmit (e.g., via the mobile server system 340) a message to the electronic device 106 requesting information regarding the purpose of the visit to the branch location 400. Alternatively, an employee at the branch location 400 requests such information, and the information is transmitted to the customer interaction system 100 (e.g., the mobile server system 340).

Depending on the purpose of the visit and/or whether or not a prearranged appointment has been established, the customer interaction system 100 may select an appropriate agent to whom the interaction will be routed. For example, if the branch location 400 is a local bank and the purpose of the visit by the customer 108 is to discuss applying for a mortgage, the customer interaction system 100 may select an agent having a suitable skill or knowledge level regarding mortgage loans, and a suitable level of availability to interact with the customer 108, and who is currently assigned to handle such interactions or activities according to the agent's schedule. Thus, according to embodiments of the invention, the customer interaction system 100 may operate to facilitate routing an in-person interaction between a customer or user, and an agent or employee of a branch location according to any suitable routing strategy. The routing strategy may be associated with, for example, the particular branch location, the detected proximity device 118, or the like.

Upon identifying the presence of the user 108 at the branch location 400, the customer interaction system 100 may transmit (e.g., via the mobile server system 340) the a message to the electronic device 106 to confirm the appointment time and notifying the user 108 that an agent will greet the user 108 shortly. According to some embodiments, the customer interaction system 100 may additionally transmit (e.g., via the mobile server system 340) a message to a workstation 424 operated by an agent 426 to notify the agent 426 of the arrival of the user 108. Additionally, upon identifying the presence of the user 108 at the branch location 400, the customer interaction system 100 may assign a waiting number to the user 108 which may be displayed on the electronic device 106 and/or a wallboard display showing the order of the waitlist of current customers waiting to be helped.

The customer interaction system 100 may then calculate a wait time for the user 108 based on the current activities of the agent 426, or the agent 426 may manually enter an estimated wait time into a user interface operating on the work station 424. The customer interaction system 100 may transmit (e.g., via the mobile server system 340) the wait time to the electronic device 106 along with a message instructing the user 108 to proceed to a waiting area 428.

Upon the user 108 arriving at location 430 within the waiting area 428, the electronic device 106 may detect or receive a signal from the proximity device 118b as discussed above. The customer interaction system 100 may add a new entry to the interaction time data 418 and interaction activity data 420 indicating the time of the arrival at the location 430 and the activity associated with the time entry (e.g., customer waiting for service). Additionally, the customer interaction system 100 may add a new entry to the media type data 422 indicating the interaction type is "store" or "in person."

As the user 108 is waiting in the waiting area 428, the user 108 may decide to use the electronic device 106 to engage in an IMR session or communication via the IMR server 334. For example, the user 108 may browse a website or mobile application of the business 102 to initiate a chat session with a remote contact center agent, or may initiate a voice call with a remote contact center agent, regarding the visit to the branch location 400 or regarding products or services offered by the business 102. The customer interaction system 100 may store time information about the IMR session in the interaction time data 418, along with a corresponding entry in the interaction activity data 420 indicating the activity during the IMR session, as well as an entry in the media type data 422 indicating the communication channel or media type of the IMR session (e.g., chat, voice, etc.).

Upon completing the previous task, the agent 426 may become available to interact with the customer 108. The customer interaction system 100 may transmit (e.g., via the mobile server system 340) a message to the workstation 424 indicating the location of the user 108 based on the proximity information relating to the location of the electronic device 106 at the location 430. Accordingly, the agent 426 may view the message and proceed to the waiting area 428 to greet the customer 108.

The agent 426 may then lead the customer 108 to the location 434 near the workstation 424, at which time the electronic device 106 may detect or receive a signal from the proximity device 118c as discussed above. The customer interaction system 100 may add a new entry to the interaction time data 418 and interaction activity data 420 indicating the time of the arrival at the location 434 and the activity associated with the time entry (e.g., customer receiving service from agent 426). Additionally, the customer interaction system 100 may add a new corresponding entry to the media type data 422 indicating the interaction activity is a "store" or "in person" interaction or media type.

During the interaction between the agent 426 and the customer 108, the customer interaction system 100 may add additional entries to the interaction time data 418, the interaction activity data 420, and the media type data 422, depending on the activities of the customer 108 and the agent 426. For example, the agent 426 may interact with the workstation 424 to review various information about the customer 108 and research questions asked by the customer 108. Each activity may be recorded by the customer interaction system 100 and stored in the interaction object 410.

According to some embodiments, the customer interaction system 100 may further facilitate recording interactions between the agent 426, the customer 108, and another person or system (e.g., a contact center agent located offsite or an IMR server) that is not located at the branch location 400. For example, during the interaction between the agent 426 and the customer 108, the agent 426 may wish to engage in a telephone communication with an offsite employee or agent of the business 102 to facilitate a transaction with the customer 108. Such communications may additionally be stored in the interaction time data 418 and the interaction activity data 420. During the interaction with the other person or system, the customer interaction system 100 may forward or transmit the interaction object 410 or information included in the interaction object 410 to the second person or system and facilitate establishing communication between the first resource and the second resource, for example, via a voice or text based communication. Thus, according to embodiments of the present invention, the customer interaction system 100 may initiate a request for communication between a first resource (e.g., an agent or employee of the physical establishment or retail location 400) at a physical establishment and a second resource (e.g., an offsite agent or employee and/or an IMR server system) associated with a customer contact center. The customer interaction system 100 may further forward the interaction object 410 associated with the request for communication, for example, to the second resource, and establish a communication between the first resource and the second resource.

Upon completion of the interaction between the agent 426 and the customer 108, the customer 108 may proceed toward the exit of the branch location 400 but may, at a location 435, pass by a product display 436 with merchandise (e.g., products or services offered for sale by the business 102) 438 on display. The electronic device 106 may detect or receive a signal from a proximity device 118d, as discussed above, located on the product display 436 as the customer 108 passes nearby the proximity device 118d. The customer interaction system 100 may add additional entries to the interaction time data 418 and the interaction activity data 420, indicating the close proximity between the electronic device 106 and the proximity device 118d. Additionally, according to some embodiments, depending on the duration of time that the electronic device 106 is nearby the proximity device 118d, the customer interaction system 100 may enable the business 102 to initiate follow-up interactions with the customer 108 or influence future interactions. For example, according to some embodiments, if the customer 108 lingers near the merchandise 438 for longer than a predetermined amount of time, the customer interaction system 100 may determine that the customer 108 has an interest in the merchandise 438, and may transmit a message or notification to the electronic device 106 (e.g., for display using the module 126 on the display screen of the electronic device 106) offering discount coupons or promotional material related to the merchandise 438 or a related product or service. For example, in an embodiment in which the branch location 400 is a grocery store or retail location, the merchandise 438 may be a jar of peanut butter and the customer interaction system 100 may transmit a message to the electronic device 106 offering a digital coupon for a jelly product.

In another embodiment, in response to the interaction time data 418 and the interaction activity data 420 including information that the customer 108 may have an interest in a particular product or service offered by the business 102 (e.g., because the customer 108 lingered near a particular merchandise 438 at the branch location 400), the customer interaction system 100 may initiate a subsequent communication or interaction on behalf of the business 102. For example, the customer interaction system 100 may initiate an outgoing communication (e.g., telephone, email, SMS text message, chat message, etc.) from an agent or employee of the business 102 to an electronic device associated with the customer 108 (e.g., the electronic device 106).

In another embodiment, as a customer 108 navigates through a branch location 400, the customer interaction system 100 may add additional entries into the interaction time data 418, the interaction activity data 420, and the media type data 422 as the customer 108 passes within the proximity of various proximity devices 118 located throughout the branch location 400. Such proximity devices 118 may be positioned near or at the location of products or display shelves, near agents or agent workstations, near or on checkout or cash register stations, and the like. Further, when the customer 108 purchases a product or service of the business 102, for example, at a checkout or cash register workstation, such purchases may be included as entries in the interaction time data 418 and the interaction activity data 420 (e.g., via an electronic point of sale system operating on an electronic device 110 operated by an agent or employee of the business 102 and in communication with the customer interaction system 100). Additionally, when the customer 108 engages with an agent, additional interaction time data 418 and interaction activity data 420 may be added to the interaction object 410, as discussed above. Thus, according to some embodiments of the present invention, the customer interaction system 100 may enable path analytics of customer activity within a branch location, by generating proximity and activity information regarding which products and services were viewed by customers, how long customer spent viewing products or services, which products or services were purchased, which agents or employees interacted with customers, as well as the sequence of such events. Accordingly, businesses may be enabled to analyze the activities of customers within branch locations for the purposes of improving the layout or location of products or services within branch locations, initiate subsequent communications or interactions with customers based on the proximity and activity information, or otherwise reorganize business and marketing efforts to increase or maintain profitability.

After the customer 108 has completed interacting with employees or agents at the branch location 400, and has finished browsing products and/or services at the branch location 400, the customer may exit the branch location 400, thereby leaving the proximity of the proximity devices 118*a*-118*d*. As the customer 108 leaves the branch location 400, the electronic device 106 may once again communicate with the proximity device 118*a* to detect the customer 108 leaving the branch location 400. Alternatively, the customer interaction system 100 may determine that the customer 108 has left the branch location in response to the electronic device 106 not receiving a data signal from any of the proximity devices 118*a*-118*d* within the branch location 400 for a predetermined amount of time (e.g., because the user 108 has left the proximity of the proximity devices 118*a*-118*d*). Detection of the user 108 leaving the branch location 400 may be further recorded in the interaction object 410 (e.g., as additional entries to the interaction time data 418 and the interaction activity data 420, along with a corresponding entry in the media type data 422). Any follow-up or post-interaction work conducted by the agent 426 may also be recorded in the interaction object 410.

At the conclusion of the interaction session, the interaction object 410 may be stored in mass storage device 120 for subsequent analysis and action on the part of the business 102. For example, the recorded interaction object 410 (or information recorded as part of the interaction object 410) may be incorporated into profile information associated with the user 108 such that subsequent interactions between employees or agents of the business 102 may be more productive. The collected information may also be used to compute statistics for the branch location 400 for determining whether or not goals and/or objectives of the branch location have been met. The statistics may relate, for example, to interaction wait times (e.g., by computing an elapsed time between a customer arriving and the customer being helped by an agent), service duration, and any other relevant key performance indicators.

Additionally, by tracking the activities of customers as they engage in interactions with businesses in person at retail or store locations, embodiments of the present invention enable businesses to collect the same or similar information that may be collected in the context of interactions in a contact center environment. For example, information about customers' activities and interactions during an in-person visit to a retail location may be utilized for subsequent routing decisions, (for example, to route interactions to agents that have an appropriate skill level to match the concerns of the user 108) or to track consumer demand for products and/or services.

Additionally, by monitoring activities of consumers at retail or branch locations, embodiments or the present invention enable businesses to generate notifications to customers of expected wait times or to generally provide notifications to customers about products or services they are browsing at the retail or branch location. Additionally, because the customer interaction system 100 monitors the location of customers within a branch or retail location as well as various types and durations interactions that occur while customers are present, businesses may be enabled to track how well particular branch or retail locations are meeting goals for various business objectives or key performance indicators ("KPIs") associated with the physical establishment such as the amount of time it takes for customers to be greeted by agents, the amount of time required to resolve particular issues, and the like. In addition to tracking KPI performance, the customer interaction system 100 may enable businesses to meet KPI performance goals by, for example, notifying an agent that a customer has been waiting too long and should be helped soon, or otherwise generally providing feedback to agents at the retail or branch location regarding KPI performance.

Additionally, upon routing an interaction to a particular agent, the customer interaction system 100 may enable display of a notification (e.g., a screen-pop) to an electronic device operated by the recipient agent, which may include information about the customer or the interaction that may be relevant to the agent for the purposes of facilitating the interaction. Further, the customer interaction system 100 may detect the transfer of an interaction from a first agent to a second agent within a branch or retail in-person location based on proximity information of the customer, or to a second agent at a remote location, and automatically generate a notification for displaying relevant information about the customer or the interaction on the electronic device of the second agent.

Accordingly, embodiments of the present invention may facilitate recording information and data related to in-person interactions between customers and a business, by generating proximity information regarding the proximity of the customers to proximity devices located within branch locations of the business, and recording interaction time and interaction activity information corresponding to the proximity information. Thus, businesses may be enabled to track in-person interaction information in a similar way to the information that is tracked and recorded in the context of a contact center environment.

Figure 5:
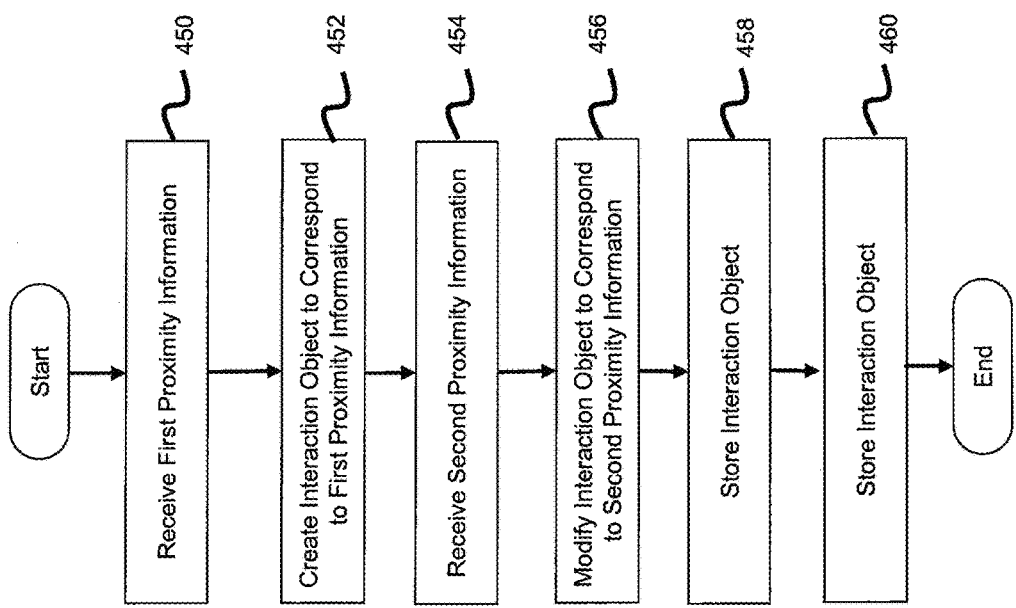
FIG. 5 is a flow diagram of a process executed by the customer interaction system in creating an interaction object in response to proximity information according to some embodiments of the present invention.

FIG. 5 is a flow diagram of a process executed by the customer interaction system in creating an interaction object in response to proximity information according to some embodiments of the present invention. The process may be described in terms of a software routine executed by a processor based on instructions stored in memory. The instructions may also be stored in other non-transient computer readable media such as, for example, a CD-ROM, flash drive, cloud storage system, or the like. A person of skill in the art should also recognize that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

At block 450, the customer interaction system 100 receives first proximity information relating to a proximity between an electronic communication device (e.g., electronic device 106) carried by a customer and a first proximity device (e.g., proximity device 118a) located in a first location of a physical establishment associated with a customer contact center. The proximity information may include, for example, a calculated distance between the electronic communication device and the first proximity device, or may include a data signal and/or a data signal strength received by the electronic communication device from the proximity device for subsequent calculation of the distance. The proximity information may additionally include any other suitable information for the purposes of calculating and/or detecting the distance or proximity between the electronic device and the first proximity device.

At block 452, in response to receiving the first proximity information, an interaction object (e.g., the interaction object 410) including data corresponding to the first proximity information. That is, upon receiving the proximity information indicating, for example, that a customer has entered the proximity of a proximity device (e.g., at or near the entrance of a retail or branch location), the customer interaction system 100 generates an interaction object to record the activities of the customer corresponding to the location of the customer at or near the first proximity device.

At block 454, the customer interaction system 100 receives second proximity information relating to a proximity between the electronic communication device and a second proximity device (e.g., the proximity device 118b) located in a second location of the physical establishment. The proximity information may include, for example, a calculated distance between the electronic communication device and the first proximity device, or may include a data signal and/or a data signal strength received by the electronic communication device from the proximity device for subsequent calculation of the distance. The proximity information may additionally include any other suitable information for the purposes of calculating and/or detecting the distance or proximity between the electronic device and the first proximity device.

At block 456, in response to receiving the second proximity information, the customer interaction system 100 modifies the interaction object to include data corresponding to the second proximity device.

At block 458, the customer interaction system 100 stores the interaction object in a first data storage device associated with a customer, wherein the first data storage device or a second data storage device further stores data of contact center interactions between the customer and resources of the customer contact center.

At block 460, the customer interaction system 100 retrieves the stored data of the interaction object and the data of the contact center interactions for generating an output based on the retrieved data. For example, the output of the retrieved data may include displaying the retrieved data on a display device of an agent of the customer contact center.

Figure 6A:
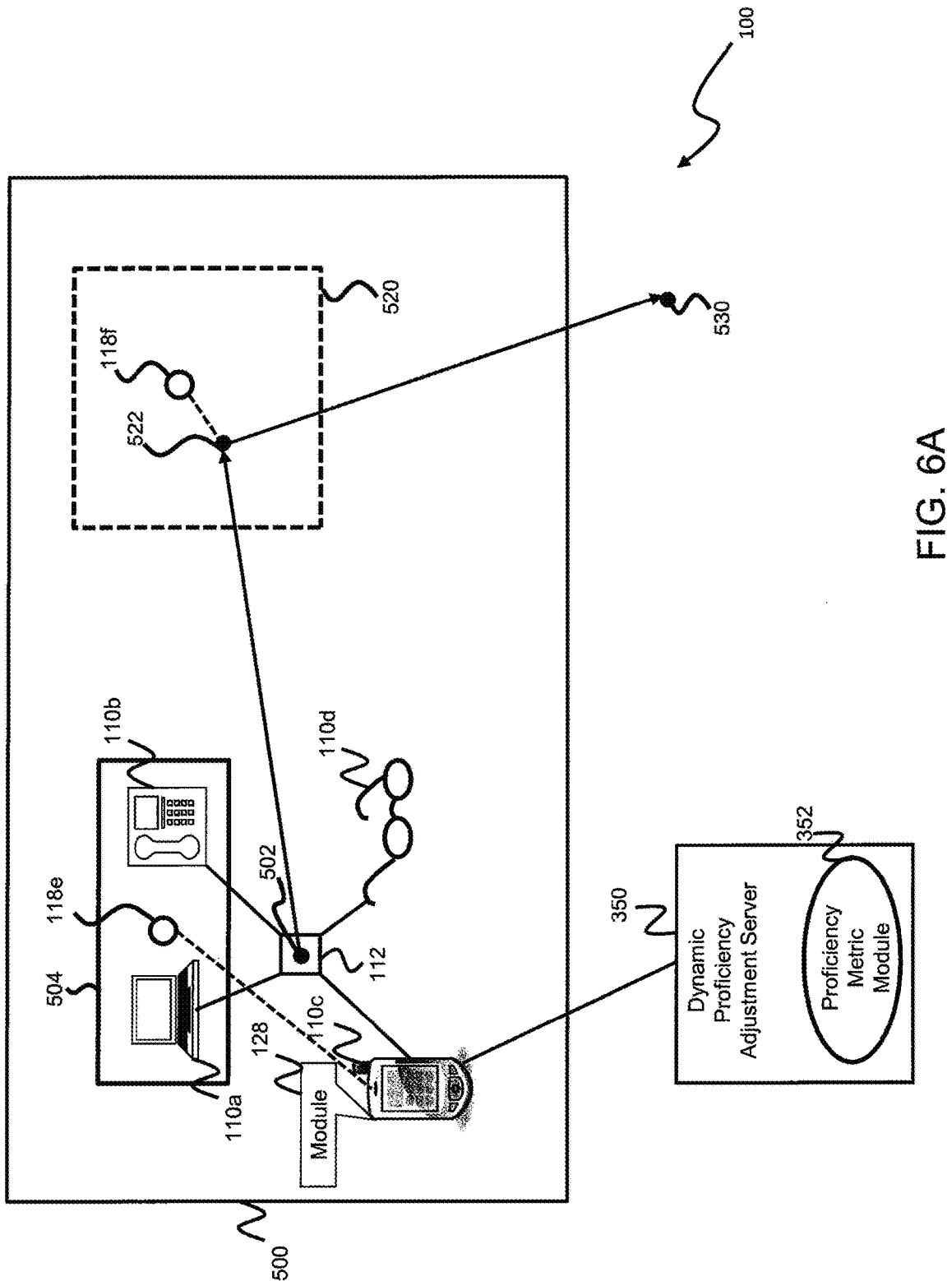
FIG. 6A is a floor map of a contact center environment according to some embodiments of the present invention.

FIGS. 6A and 6B illustrate an example process of managing customer interactions in the context of a contact center operated by the business 102 as part of the customer interaction management system 100 according to some embodiments of the present invention. As shown in FIG. 6A, a plurality of electronic devices 110a-110d may be associated with or operated by a user (e.g., an agent or employee) 112 within a contact center 500. For example, at a location 502 the user 112 may be logged-in or checked-in to a workstation 504 that includes a desktop computer 110a and a telephone 110b. Additionally, the user 112 may operate a smartphone 110c with the module 128 described above running as part of a software application running on the smartphone 110c. The user 112 may further be wearing a wearable communication device (e.g., having an optical head-mounted display) 110d.

Each of the electronic devices 110a-110d may be in electronic communication with the various contact center components described above with respect to FIG. 3, which may be located within the contact center 500 or hosted remotely outside of the contact center. Thus, the customer interaction management system 100 may route calls and interactions to various ones of the electronic devices 110a-110d as part of the routing strategy of the contact center 500, depending on the skill level and proficiency of the user 112, and the availability of the user 112 relative to other agents or employees of the contact center 500. The user 112 may additionally have access to various customer and product or service information stored in the memory 120 by way of the desktop computer 110a.

In order to facilitate routing to an appropriate agent, the customer interaction system 100 may generate proficiency level information or data 510 corresponding to the user 112 based on the capabilities of the user 112 at any given time depending on the context of various interactions. For example, the proficiency level information 510 may include a plurality of proficiency categories 512a-512e, although number and designation of the proficiency categories may vary according to the design of the customer interaction system 100. For example, the proficiency categories 512a-512e may include the proximity of the agent relative to an appropriate electronic communication device, the physical location of an agent, data communication network connection quality, agent ability to access customer information, and agent ability to engage in an interaction using an appropriate communication channel.

A numerical value or other score for each of the proficiency level categories 512a-512e may be determined by the customer interaction system 100 depending on the context of various interactions such as potential topics, types of interactions, or communication devices, or communication channels. For example, the topics may include customers wishing to purchase products or services, customers wishing to lodge complaints about products or services, customers in need of technical support, or customers wishing to follow-up to previous interactions with the business 102. The number and designation of the topics is not limited to those shown in FIG. 6B, however, and the topics may include any relevant topics or subject matters according to the design of the customer interaction system 100. Other contexts may include the type of communication device necessary to engage in an interaction or the communication channel of a communication. For example, if a customer has contacted a contact center via a telephone communication, an agent will need to have access to a communication device (e.g., a telephone) to which the telephone communication can be routed.

Additionally, as part of the routing strategy, each of the agents may further have a numerical value or score associated with their skill level (e.g., based on the agents' training or experience) for each of the context categories. The customer interaction system 100 may proceed with routing interactions, according to any suitable routing strategy, to agents based on the agents' skill level and proficiency level, to match customer interactions or communications with an agent having an appropriate or minimum threshold skill and proficiency level as well as a satisfactory availability.

Returning to FIG. 6A, when the user 112 is located at location 502, the electronic device 110c running the module 128 may detect or receive a signal from a proximity device 118f, as discussed above. That is, the proximity device 118f may be positioned at the agent workstation 504 and may be within a predefined range of the electronic device 110c when the user 112 is at the location 502. Because the agent is additionally in close proximity to each of the electronic devices 110a-110d, is in a private or appropriate location to engage in any type of interaction based on privacy and external environmental concerns, has a high quality data communication network connection, has full access to all customer information through the desktop computer 110a, and has full access to all appropriate or possible communication channels (e.g., voice, chat, email, etc.), the proficiency level or value for each topic in the proficiency information 510 and for each proficiency level category may be the highest possible level (e.g., 10 out of 10). Given that the user's proximity to the various electronic devices 110a-110d is also deemed to be the same, an interaction may be routed to any one of the devices based on, for example, the user's configuration settings. Alternatively, the customer interaction system 100 may select among the electronic devices 110a-110d to route the interaction according to the context of the interaction. For example, a particular media type such as a chat communication may be routed to the desktop 110a rather than the telephone 110b.

During the course of the day, however, the user 112 may have a meeting or conference scheduled in a conference room 520. Thus, during the meeting, the user 112 may leave the location 502 and move to location 522 within the conference room 520 at the contact center 500. Because the electronic devices 110a and 110b are fixed or secured to the work station 504, the user 108 may no longer have immediate access to them at the location 522. However, the user 112 may bring the electronic devices 110c and 110d to the conference room 520. The electronic device 110c may enable the user 112 to receive voice and data communications at the location 522, and the electronic device 110d may enable the user 112 to engage in limited access and view to customer information (e.g., by way of an optical head-mounted display). However, the ability of the user 112 to handle all topics of communication or interactions may be reduced due to less robust communication capabilities and limited access to view customer information. Additionally, during the meeting at the location 522, the user 112 may have reduced privacy or reduced response time.

Accordingly, when the user 112 moves from the location 502 to the location 522, the dynamic proficiency adjustment server 350 of the customer interaction system 100 may reduce the proficiency level values for each of the topics corresponding to the different proficiency categories 512a-512d (for example, by decreasing the values from 10 out of 10 to 8 out of 8). On the other hand, because the user 112 is still located within the contact center 500, the user 112 may be able to return to the workstation 504 relatively quickly, if necessary. Additionally, the user 112 still may have a sufficient level of proficiency to handle each of the topics at the location 522 due to the access to the electronic devices 110c and 110d, albeit at a reduced level of efficiency or effectiveness. Therefore, the dynamic proficiency adjustment server 350 may not decrease the proficiency level values completely (e.g., to 0 out of 10) when the user 112 is located at the location 522.

Because the user 112 is no longer located at the workstation 504, however, and therefore no longer has immediate access to the desktop computer 110a and the telephone 110b, the dynamic proficiency adjustment server 350 may completely decrease (e.g., to 0 out of 10) the proficiency level values for the category 512e corresponding to interaction contexts that may be suited for interacting with the communication devices 110a and 110b.

Based on the detected proximity of the user to the various electronic devices 110 and/or the adjustments to the proficiency level values of associated with the user 112, the customer interaction system 100 as part of its routing strategy may route communications or interactions to different agents or different electronic devices. For example, if the contact center 500 receives an incoming telephonic communication from a customer while the user 112 is at the location 522, because the proficiency level associated with the user 112 for communicating via the telephone 110b may be reduced completely (e.g., to 0 out of 10), the customer interaction system 100 may route the interaction to the electronic device 110c or 110d rather than the telephone 110b due to the user being far from the telephone 110b but close to the other electronic devices 110c and 110d, assuming the customer interaction system 100 has otherwise determined that the user 112 is sufficiently proficient in other relevant categories and has an appropriate skill level to handle the interaction. Alternatively, the customer interaction system 100, may determine based on the adjusted proficiency levels, the skill level of the agent 112, the context of the interaction, and the availability of other agents, that the communication should be routed to an alternative agent, and may therefore route the interaction to a different agent.

After the meeting is completed, the user 112 may return to the workstation 504, at which point the electronic device 110*c* running the module 128 may sense or receive a signal from the proximity device 118*f* indicating close proximity to the workstation 504. Accordingly, the dynamic proficiency adjustment server 350 may again adjust the proficiency level values to increase the values to their full level (e.g., 10 out of 10).

Alternatively, after the meeting, the user 112 may be called to an off-site location 530 that is outside of a predetermined distance or proximity to the proximity devices 110*d* and 110*e*. In response to receiving an indication that the user 112 is located offsite, the dynamic proficiency adjustment server 350 may adjust the proficiency level values associated with the user 112 for each of the topics accordingly. The dynamic proficiency adjustment server 350 may, for example, receive information from the electronic devices 110*c* and 110*d* that data communication connection quality is relatively high at the offsite location 530, but voice communication connection quality is relatively poor. Thus, the dynamic proficiency adjustment server 350 may reduce the proficiency level value for the categories 512*c* and 512*d* less than that for the category 512*e*. On the other hand, the dynamic proficiency adjustment server 350 may receive location information (e.g., utilizing another proximity device, cell phone towers, or global positioning system satellites) from the electronic devices 110*c* and 110*d* that the offsite location 530 is located at a busy public forum, where privacy and environmental noise may be high. Thus, the dynamic proficiency adjustment server 350 may lower the proficiency level value for the category 512*b* more than if the user 112 were found to be in a quiet or private setting.

As the proficiency levels associated with the user 112 are adjusted dynamically throughout the day depending on the location, activities, and environment of the user 112, the customer interaction system 100 may therefore be enabled to route communications to the user 112 more effectively considering the constraints of the circumstances of the user 112.

Accordingly, embodiments of the present invention may utilize proximity or location information to adjust the proficiency level of agents (including, for example, knowledge workers) in a contact center environment depending on the agents' location, activities, and/or environment and their corresponding ability to engage in certain types of interactions in order to inform the routing decisions that are made, for example, whether to route to a different device or a different agent. The proximity information may also be used to select the appropriate electronic device to which an interaction is to be routed, based on the context of the communication and the agent proficiency levels.

As discussed above, with respect to FIG. 6B, each different interaction contexts (e.g., interaction communications or topics) may correspond to one or more proficiency level categories (e.g., categories 512*a*-512*e*, although embodiments of the present invention are not limited to the proficiency level categories shown in FIG. 6B), depending on business rules or the design of the customer interaction system 100. In the case where only a single proficiency level category corresponds to a particular interaction context, a routing decision may be performed by considering the proficiency level for that single category along with other relevant routing factors (e.g., agent skill, agent availability, agent scheduling, etc.) by selecting an appropriate agent with a sufficient proficiency level or the highest proficiency level compared to other qualified agents.

In the case where more than one proficiency level categories correspond to a given interaction context, however, the customer interaction system 100 may convert the multiple proficiency level category values into a single scalar value for the purposes of making a routing decision. For example, depending on the context of the interaction, the proficiency level categories may be pre-assigned a relative ranking according to their importance relative to other proficiency level categories for the same interaction context. Thus, when selecting an agent for routing the interaction, the customer interaction system 100 may consider the most important or highest ranked proficiency level category corresponding to the context of the interaction, followed by the next most important or next highest ranked proficiency level category, and so on. If multiple agents are determined to have the same proficiency level for the first proficiency level category, and all other relevant metrics for the routing determination are equal, the customer interaction system 100 may compare the proficiency level values of the multiple agents for the next ranked proficiency level category, and so on, until an agent is selected. The relative ranking of the proficiency level categories may be predetermined according to business rules, the different interaction contexts, and the design of the customer interaction system 100.

According to other embodiments, the customer interaction system 100 may use any suitable method for converting the values of the multiple proficiency level categories into a single value, for example, by only considering one of the proficiency level categories depending on the context of the interaction, calculating an average value of the proficiency level category values, calculating the sum of the proficiency level category values, and the like.

Thus, according to embodiments of the present invention, the proximity information of agents may be utilized to enrich routing logic in a contact center environment for selecting an agent to route interactions. According to some embodiments, the proficiency levels of agents may be considered in addition to other relevant routing rules such as agent skills, agent availability, agent scheduling, and the like. According to some embodiments, the proficiency levels of agents may cause other routing considerations to be adjusted, for example, by increasing or decreasing the skill level of agents based on their proficiency levels, or the proficiency levels of agents may be a separate consideration as part of the routing logic.

As discussed above, the routing of an interaction may be informed by business or routing rules including agent skills and proficiency, and also any suitable other routing considerations or algorithms known in the art (e.g., round robin, most idle agent, next available agent, etc.). The routing decision may also adjust agents' proficiency level based on the agents' the physical locations, the communication characteristics of the agents' physical locations (e.g., ambient noise level, privacy level, agent ability to engage in interactions), and the modality profile of agents (e.g., ability to type, ability to speak, ability to read, ability to hear), based on the context of the communication or interaction.

In other words, embodiments of the present invention may enable a business to route communications or interactions to agents in view of the physical location of agents, as well as other routing considerations, based on agents' dynamically calculated proficiency for handling interactions. For example, in the context of a contact center, different agents may be: (1) sitting at their workstation and logged into their agent user interface with full access to customer and product/service information; (2) away from their workstation and walking to their car for lunch; (3) driving in their vehicle to/from work or between off-site projects; (4) at lunch in a noisy restaurant; (5) in an off-site or remote location with poor data connection but strong voice communication capabilities through a land line connection; (6) in an off-site or remote location with poor voice communication but functioning data communication connection. Depending on such varying physical locations of agents, embodiments of the present invention may dynamically (e.g., periodically, regularly, or as agent locations change) adjust the proficiency level of agents for different types of communications or interactions and route communications according to agent proficiency levels (e.g., to agents having sufficient proficiency or having the highest level of proficiency among other available agents with adequate or high skill).

In addition to these parameters, the communication interaction system 100 may also have access to the modalities available to agents such as the ability to read a screen and see visuals, the ability to hear comfortably, the ability to type, and the ability to speak with ease. For instance, an incoming phone call from a hot lead with a high level of contextual information (e.g., activities that the communication initiator undertook prior to initiating the communication, such as web site page visits, downloads, webinar registrations, previous purchases) stored in memory should be routed to an agent who is capable of reviewing such rich information and who is able to sufficiently engage in the interaction (e.g., someone who is able to see the information in a screen via a laptop, wearing a wearable communication device, holding a smart phone, etc.) and is in a setting where they can speak comfortably (e.g., at their agent workstation, at their home, in a sufficiently private setting, etc.). Someone who is driving may not have such calls routed to them. Incoming communications involving sensitive information (e.g., financial or health related interactions) not be routed to agents who are in a public setting (such as a public restaurant). Similarly, interactions that may involve complex interactions (e.g., calls that may require an agent to consult with a manager, supervisor, or other knowledgeable agent) may be routed to agents who are in close proximity to managers and other domain experts who can quickly consult with or advise the recipient agent.

FIG. 7 is a flow diagram of a process executed by the customer interaction system in routing interactions according to agent proximity information according to embodiments of the present invention. The process may be described in terms of a software routine executed by a processor based on instructions stored in memory. The instructions may also be stored in other non-transient computer readable media such as, for example, a CD-ROM, flash drive, cloud storage system, or the like. A person of skill in the art should also recognize that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

At block 540, the customer interaction system 100 receives information on an interaction to be routed. For example, the information on the interaction to be routed may be an indication that a contact center has received an incoming communication from a customer, for example, a telephone call.

At block 542, the customer interaction system 100 identifies contextual information associated with the interaction. For example, the contextual information may include a topic of communication, the medium of communication or communication channel, previous interaction history and the like.

At block 544, the customer interaction system 100 receives proximity information relating to a proximity between an electronic device and a proximity device. For example, the proximity information may include information indicating a relative distance or proximity between an employee or agent of a business and various electronic communication devices in a contact center environment.

At block 546, the customer interaction system 100 adjusts the proficiency level of an agent corresponding to the context associated with the interaction to a first value in response to receiving the first proximity information. For example, the proficiency level of an agent (or agent device) in proximity to the agent's workstation (or a proximity device at the agent's workstation) may be set to a maximum value for the context associated with the interaction because the agent may have full access to all relevant information and all available communication channels, etc.

At block 548, the customer interaction system 100 determines whether or not the agent is qualified to handle the interaction based, at least in part, on the proficiency level.

At block 550, in response to determining that the agent is not qualified to handle the interaction, for example, because the agent's proficiency level is too low according to pre-defined business and routing rules, the customer interaction system 100 identifies an alternative agent, among a plurality of other agents, with a sufficient proficiency level adjusted according to the other agents proximity information.

At block 552, in response to determining that the agent is qualified to handle the interaction, or in response to identifying an alternate agent with a sufficient proficiency level to handle the interaction, the customer interaction system 100 selects an electronic device from among a plurality of electronic devices associated with the agent or the alternate agent for routing the interaction.

At block 554, the customer interaction system 100 transmits a message for routing the interaction to the selected electronic device.

Figure 8:
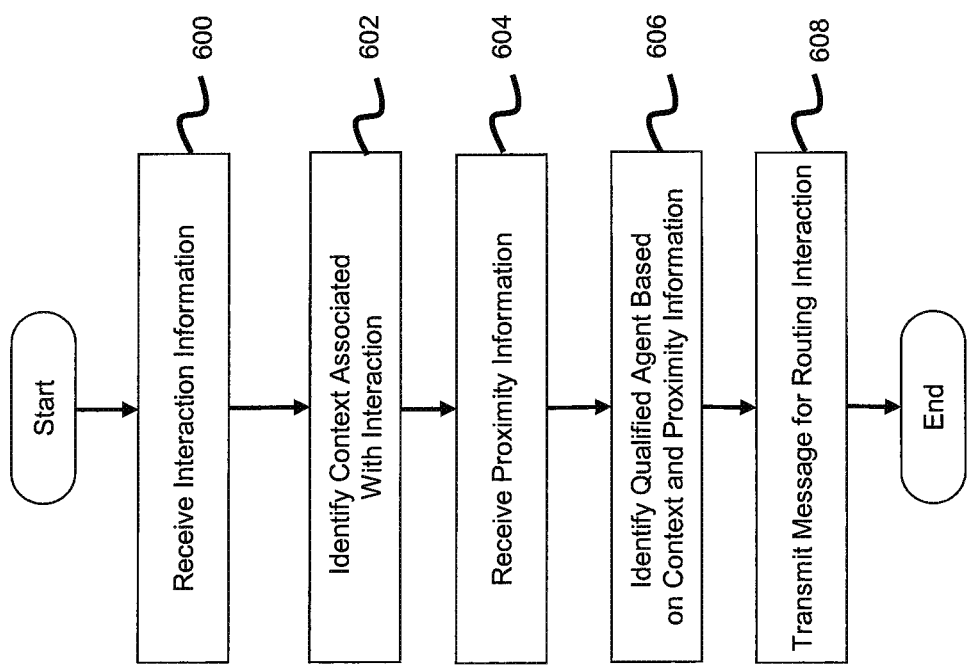
FIG. 8 is a flow diagram of a process executed by the customer interaction system in managing customer interactions according to embodiments of the present invention.

FIG. 8 is a flow diagram of a process executed by the customer interaction system 100 in managing customer interactions according to embodiments of the present invention. The process may be described in terms of a software routine executed by a processor based on instructions stored in memory. The instructions may also be stored in other non-transient computer readable media such as, for example, a CD-ROM, flash drive, cloud storage system, or the like. A person of skill in the art should also recognize that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

At block 600, the customer interaction system 100 receives information on an interaction to be routed. For example, the customer interaction system 100 may receive proximity information related to a customer relative to proximity devices located at a physical branch location operated by a business. Additionally, the information on the interaction to be routed may be an indication that a contact center has received an incoming communication from a customer, for example, a telephone call.

At block 602, the customer interaction system 100 identifies contextual information associated with the interaction. For example, the contextual information may include a topic of communication, the medium of communication or communication channel, previous interaction history and the like.

At block 604, the customer interaction system 100 receives proximity information relating to a proximity between an electronic device and a proximity device. For example, the proximity information may include information indicating a relative distance or proximity between a customer and the proximity device at a physical branch location of a business. Alternatively, the proximity information may include information indicating a relative distance or proximity between an employee or agent of a business and various electronic communication devices.

At block 606, the customer interaction system 100 identifies a qualified agent based on the context and proximity information for routing the interaction.

At block 608, the customer interaction system 100 transmits a message for routing an interaction, based on the determination of the qualified agent.

Each of the various servers, controllers, switches, gateways, engines, and/or modules (collectively referred to as servers) in the afore-described figures may be a process or thread, running on one or more processors, in one or more computing devices 1500 (e.g., FIG. 9A, FIG. 9B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 9A:
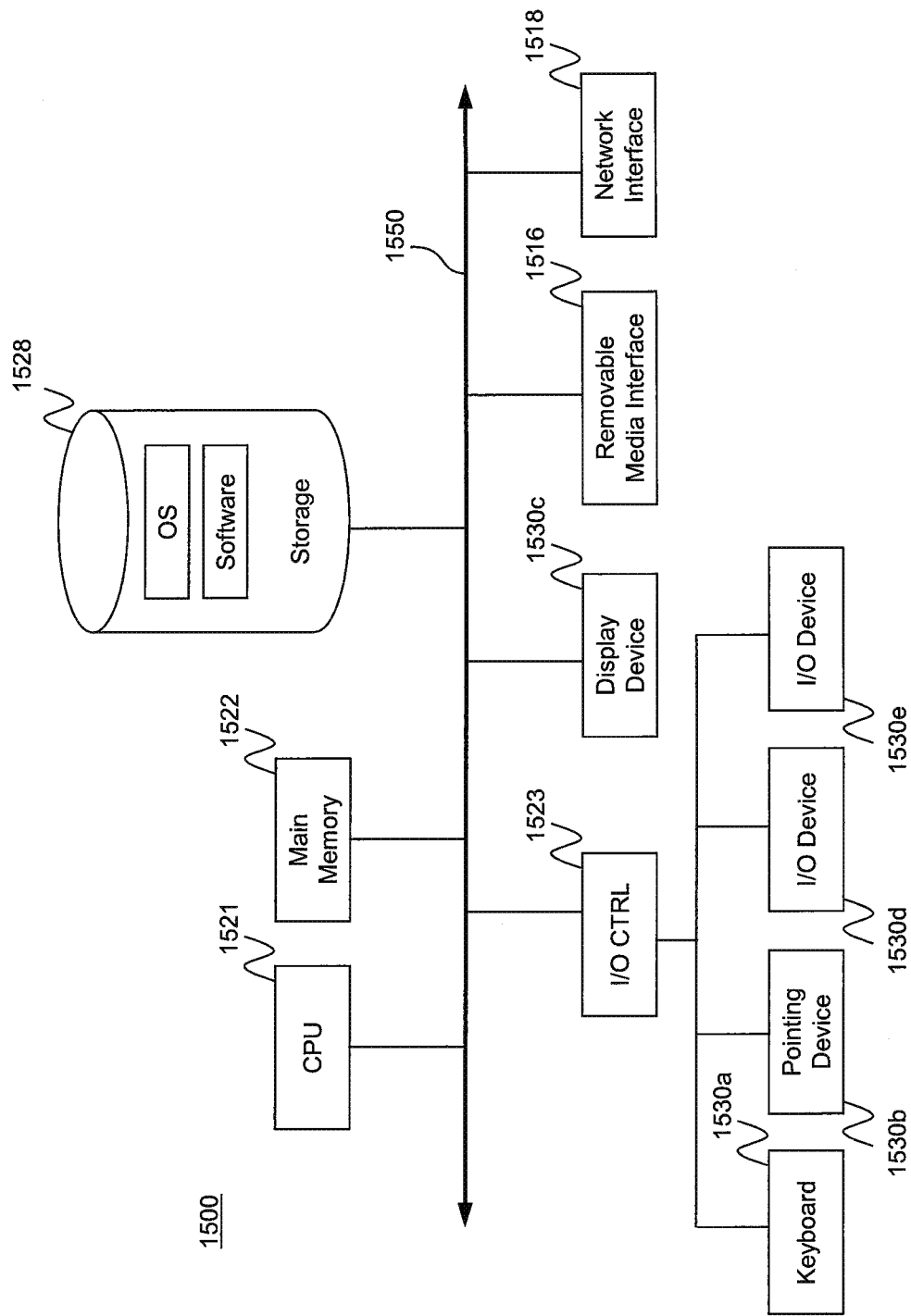
FIG. 9A is a block diagram of a computing device according to an embodiment of the present invention.
Figure 9B:
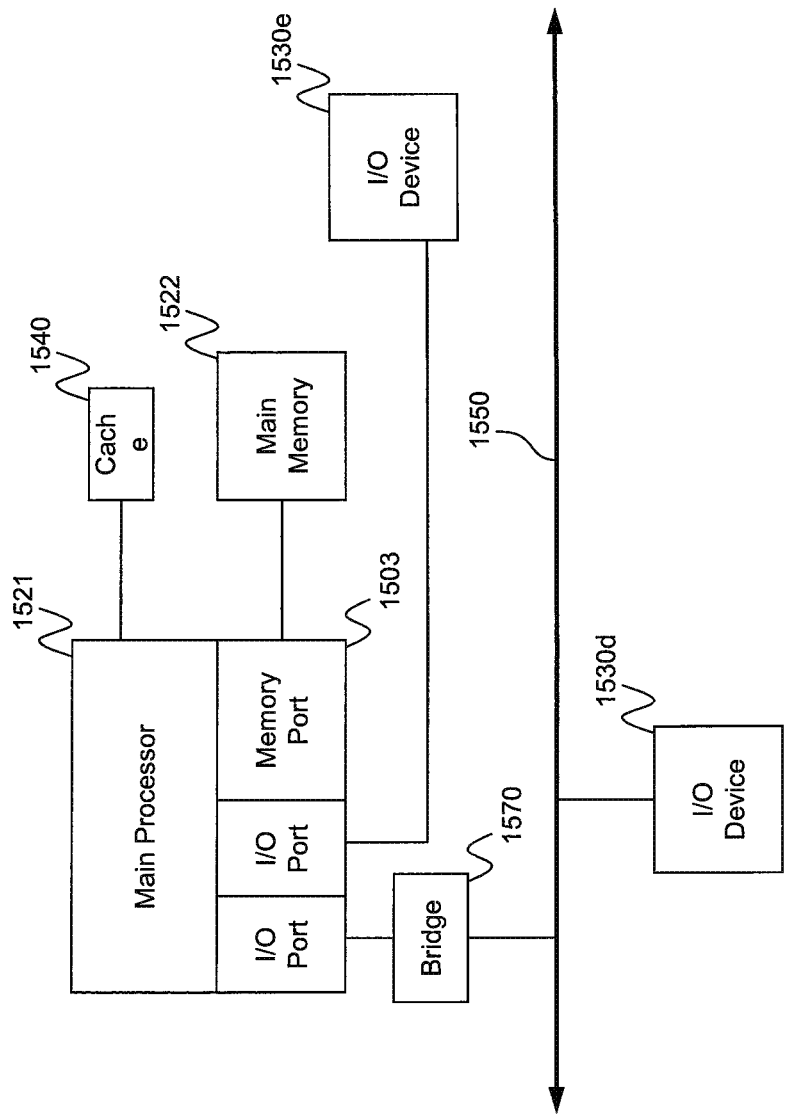
FIG. 9B is a block diagram of a computing device according to an embodiment of the present invention.

FIG. 9A and FIG. 9B depict block diagrams of a computing device 1500 as may be employed in exemplary embodiments of the present invention. Each computing device 1500 includes a central processing unit 1521 and a main memory unit 1522. As shown in FIG. 9A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 9B, each computing device 1500 may also include additional optional elements, such as a memory port 1503, a bridge 1570, one or more additional input/output devices 1530d, 1530e (e.g., microphone and/or speakers) and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 9A, the central processing unit 1521 communicates with the main memory 1522 via a system bus 1550. As shown in FIG. 9B, the central processing unit 1521 may also communicate directly with the main memory 1522 via a memory port 1503.

FIG. 9B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 9A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 9B depicts an embodiment of a computer 1500 in which the central processing unit 1521 communicates directly with I/O device 1530e. FIG. 9B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 9A, may control the I/O devices. The I/O controller may control one or more I/O devices such as a keyboard 1530a and a pointing device 1530b, e.g., a mouse or optical pen.

Referring again to FIG. 9A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 9A and FIG. 9B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figures 9C, 9D:
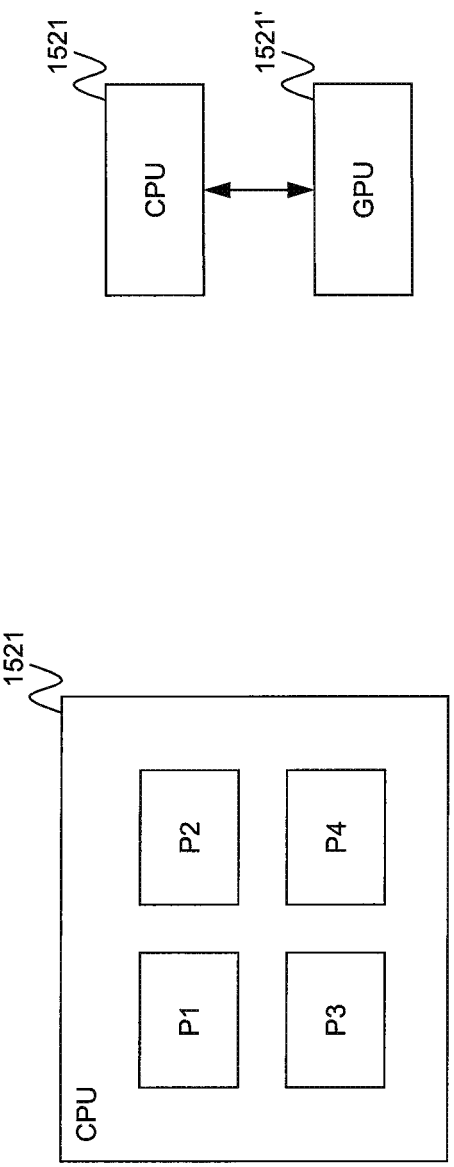
FIG. 9C is a block diagram of a computing device according to an embodiment of the present invention.
FIG. 9D is a block diagram of a computing device according to an embodiment of the present invention.

As shown in FIG. 9C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 9D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 9E:
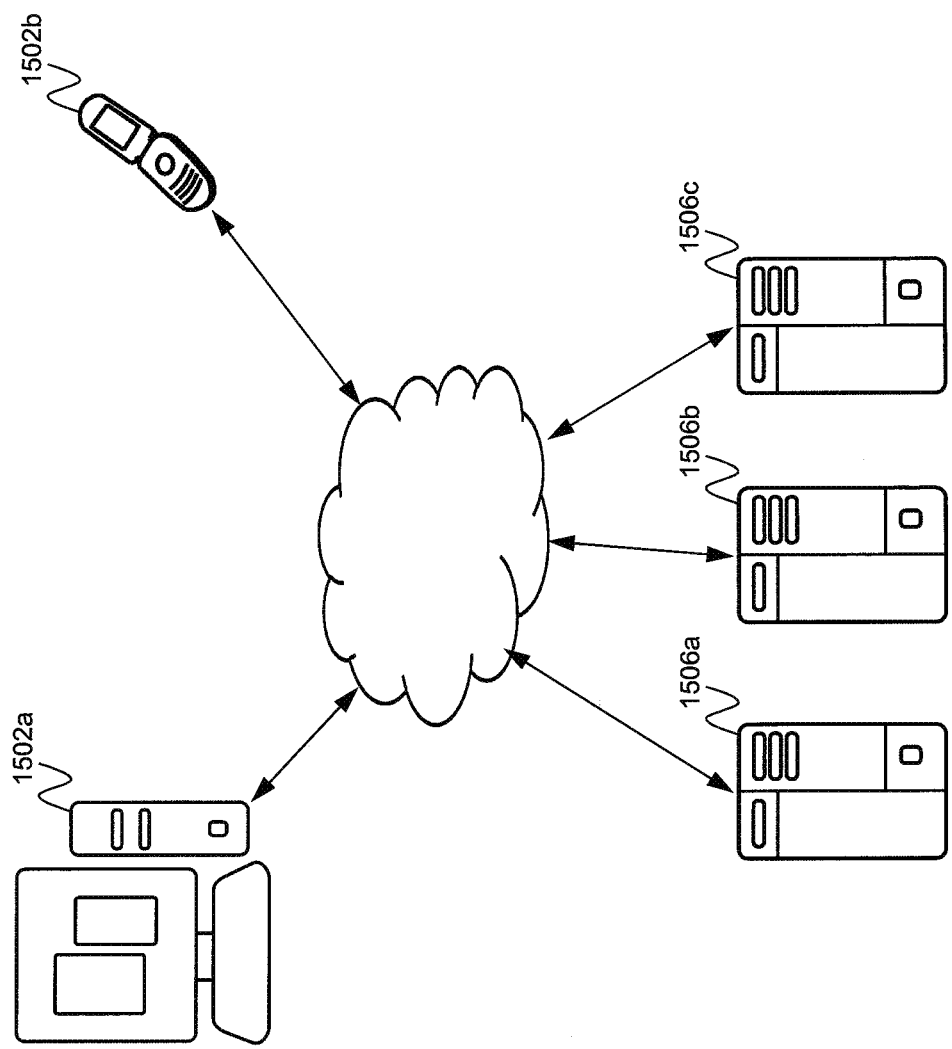
FIG. 9E is a block diagram of a network environment including several computing devices according to an embodiment of the present invention.

A computing device may be one of a plurality of machines connected by a network, or it may comprise a plurality of machines so connected. FIG. 9E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 9E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 9E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for managing customer interactions, the method comprising:
   receiving, by a processor, first proximity information relating to a proximity between an electronic communication device carried by a customer and a first proximity device located in a first location of a physical establishment associated with a customer contact center;
   in response to the receiving of the first proximity information, creating, by the processor, an interaction object including data corresponding to the first proximity information;
   receiving, by the processor, second proximity information relating to a proximity between the electronic communication device and a second proximity device located in a second location of the physical establishment;
   in response to the receiving of the second proximity information, modifying, by the processor, the interaction object to include data corresponding to the second proximity information;
   storing, by the processor, the interaction object in a first data storage device in association with a customer, wherein the first data storage device or a second data storage device further stores data of contact center interactions between the customer and resources of the customer contact center; and
   retrieving, by the processor, the stored data of the interaction object and the data of contact center interactions for generating an output based on the retrieved data.

2. The method of claim 1, wherein the interaction object comprises a user identification corresponding to the electronic device.

3. The method of claim 1, wherein the interaction object comprises first interaction time data corresponding to the first proximity information, and second interaction time data corresponding to the second proximity information.

4. The method of claim 3, wherein the first interaction time data and the second interaction time data are evaluated for determining satisfaction of an objective associated with the physical establishment.

5. The method of claim 1, wherein the interaction object comprises interaction activity data corresponding to the first proximity information.

6. The method of claim 1, wherein the interaction object comprises media type data corresponding to the first proximity information.

7. The method of claim 1, wherein the interaction object comprises a session identification corresponding to the first proximity information.

8. The method of claim 1, further comprising:
   receiving, by the processor, context information associated with the interaction corresponding to the first proximity information;
   identifying, by the processor, an agent qualified to handle the interaction based on the context information associated with the interaction; and
   transmitting, by the processor, a message for routing the interaction to the agent.

9. The method of claim 7, further comprising transmitting, by the processor, a notification corresponding to the interaction to an agent device associated with the agent.

10. The method of claim 8, wherein the context information comprises a topic of the interaction.

11. The method of claim 8, wherein the context information associated with the interaction comprises information regarding a previous interaction related to the interaction.

12. The method of claim 1, wherein the output is display of the retrieved data on a display device of an agent of the customer contact center.

13. The method of claim 1, further comprising:
initiating, by the processor, a request for communication between a first resource at the physical establishment and a second resource associated with the customer contact center;
forwarding, by the processor, the interaction object in association with the request; and
establishing, by the processor, the communication between the first resource and the second resource.

14. A system for managing customer interactions comprising:
a processor; and
a memory in communication with the processor, the memory storing instructions that, when executed by the processor, cause the processor to:
receive first proximity information relating to a proximity between an electronic communication device carried by a customer and a first proximity device located in a first location of a physical establishment associated with a customer contact center;
in response to the receipt of the first proximity information, create an interaction object including data corresponding to the first proximity information;
receive second proximity information relating to a proximity between the electronic communication device and a second proximity device located in a second location of the physical establishment;
in response to the receipt of the second proximity information, modify the interaction object to include data corresponding to the second proximity information;
storing the interaction object in a first data storage device in association with a customer, wherein the first data storage device or a second data storage device further stores data of contact center interactions between the customer and resources of the customer contact center; and
retrieving, by the processor, the stored data of the interaction object and the data of contact center interactions for generating an output based on the retrieved data.

15. The system of claim 14, wherein the interaction object comprises a user identification corresponding to the electronic device.

16. The system of claim 14, wherein the interaction object comprises first interaction time data corresponding to the first proximity information, and second interaction time data corresponding to the second proximity information.

17. The system of claim 16, wherein the first interaction time data and the second interaction time data are evaluated for determining satisfaction of an objective associated with the physical establishment.

18. The system of claim 14, wherein the interaction object comprises interaction activity data corresponding to the first proximity information.

19. The system of claim 14, wherein the interaction object comprises media type data corresponding to the first proximity information.

20. The system of claim 14, wherein the interaction object comprises a session identification corresponding to the first proximity information.

* * * * *